United States Patent
HomChaudhuri et al.

(10) Patent No.: US 9,655,054 B2
(45) Date of Patent: May 16, 2017

(54) ADAPTING BLIND RECEPTION DURATION FOR RANGE AND CONGESTION

(71) Applicant: QUALCOMM Incorporated, San Diego, CA (US)

(72) Inventors: Sandip HomChaudhuri, San Jose, CA (US); Fnu Rajkumar Samuel, San Jose, CA (US); Nitin Ashok Changlani, San Jose, CA (US); Arunkumar Jayaraman, San Jose, CA (US); Pradeep Baliganapalli Nagaraju, Milpitas, CA (US); Sumeet Kumar, San Jose, CA (US); Lian Chen, Shanghai (CN); James Simon Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/491,936

(22) Filed: Sep. 19, 2014

(65) Prior Publication Data

US 2016/0088567 A1 Mar. 24, 2016

(51) Int. Cl.
*H04W 4/00* (2009.01)
*H04W 52/02* (2009.01)
(Continued)

(52) U.S. Cl.
CPC ........ *H04W 52/0274* (2013.01); *H04B 17/30* (2015.01); *H04L 47/27* (2013.01);
(Continued)

(58) Field of Classification Search
None
See application file for complete search history.

(56) References Cited

U.S. PATENT DOCUMENTS

| 7,181,190 B2 | 2/2007 | Abhishek et al. |
| 7,242,972 B2 | 7/2007 | Harris |

(Continued)

FOREIGN PATENT DOCUMENTS

| EP | 1592176 A1 | 11/2005 |
| EP | 2106192 A2 | 9/2009 |
| WO | WO-2008124041 A2 | 10/2008 |

OTHER PUBLICATIONS

Romdhani et al., "AEDCF: Enhanced Service Differentiation for IEEE 802.11 Wireless Ad-Hoc Networks," Research Report RR-4544, Sep. 2002, 26 pgs., HAL Id: inria-00072044, ISSN 0249-6399, Institut National de Recherche en Informatique et en Automatique (INRIA), Sophia Antipolis Cedix, FR.

(Continued)

*Primary Examiner* — Bob Phunkulh
(74) *Attorney, Agent, or Firm* — Holland & Hart, LLP

(57) ABSTRACT

Methods, systems, and devices are described for adapting blind reception duration for range and congestion. A wireless station may measure channel conditions (e.g., range to an access point (AP) and channel congestion), and adjust one or more sleep timers based on the conditions. The sleep timers may each be associated with a window for reception of an expected transmission. If the transmission is not received in the window, the station may enter a sleep state to conserve power. In one example, a beacon miss timer is adjusted, and the expected wireless transmission is a delivery traffic indication message (DTIM). In another example, a content after beacon (CAB) timer is adjusted and the expected wireless transmission is the CAB. In some cases, the station may measure a delay for a number of beacons and determine the adjustment based on the delays.

28 Claims, 16 Drawing Sheets

(51) Int. Cl.
  *H04B 17/30*   (2015.01)
  *H04L 12/807*  (2013.01)
  *H04W 72/12*   (2009.01)
  *H04W 28/02*   (2009.01)

(52) U.S. Cl.
  CPC ... *H04W 52/0216* (2013.01); *H04W 52/0245* (2013.01); *H04W 28/02* (2013.01); *H04W 52/0238* (2013.01); *H04W 52/0241* (2013.01); *H04W 72/12* (2013.01); *Y02B 60/50* (2013.01)

(56) References Cited

U.S. PATENT DOCUMENTS

| | | | |
|---|---|---|---|
| 7,385,945 B1* | 6/2008 | Olson | H04W 72/005 370/328 |
| 7,787,406 B2 | 8/2010 | Park et al. | |
| 8,005,515 B1* | 8/2011 | Chhabra | H04W 52/0229 455/127.5 |
| 8,385,878 B2 | 2/2013 | Rao et al. | |
| 8,452,244 B2 | 5/2013 | Ren | |
| 8,971,229 B1 | 3/2015 | Yenganti et al. | |
| 2004/0093421 A1 | 5/2004 | Peng et al. | |
| 2004/0259542 A1 | 12/2004 | Viitamaki et al. | |
| 2005/0185666 A1 | 8/2005 | Raya et al. | |
| 2005/0221869 A1* | 10/2005 | Liu | G06F 1/3209 455/574 |
| 2006/0072488 A1 | 4/2006 | Meier | |
| 2006/0234740 A1* | 10/2006 | Sakoda | H04W 74/0808 455/507 |
| 2007/0155441 A1* | 7/2007 | Carbonaro | H04W 52/265 455/571 |
| 2008/0144493 A1 | 6/2008 | Yeh | |
| 2009/0303888 A1 | 12/2009 | Ariyur et al. | |
| 2010/0144363 A1 | 6/2010 | De Rosa et al. | |
| 2010/0296495 A1* | 11/2010 | Iino | H04L 12/46 370/338 |
| 2011/0058510 A1* | 3/2011 | Thomas | H04W 52/0216 370/311 |
| 2011/0122780 A1 | 5/2011 | Nieminen et al. | |
| 2013/0077549 A1 | 3/2013 | Chhabra et al. | |
| 2013/0122971 A1 | 5/2013 | Thomas et al. | |
| 2013/0230028 A1* | 9/2013 | Calcev | H04W 72/1231 370/336 |
| 2013/0235720 A1 | 9/2013 | Wang et al. | |
| 2013/0235773 A1 | 9/2013 | Wang et al. | |
| 2013/0272455 A1 | 10/2013 | HomChaudhur | |
| 2014/0016567 A1 | 1/2014 | Lu et al. | |
| 2014/0064166 A1 | 3/2014 | HomChaudhur | |
| 2014/0153458 A1 | 6/2014 | Shrivastava et al. | |
| 2014/0153460 A1 | 6/2014 | Shrivastava et al. | |
| 2014/0169290 A1 | 6/2014 | Seok | |
| 2014/0254502 A1 | 9/2014 | Cai et al. | |
| 2014/0280901 A1* | 9/2014 | Balachandran | H04W 24/04 709/224 |
| 2015/0029933 A1* | 1/2015 | Park | H04W 68/005 370/328 |
| 2015/0098374 A1* | 4/2015 | Homchaudhuri | H04W 52/0216 370/311 |
| 2016/0295509 A1 | 10/2016 | Saed et al. | |

OTHER PUBLICATIONS

ISA/EPO, Partial International Search Report of the International Searching Authority, Int'l Appl. No. PCT/US2015/045472, Oct. 19, 2015, European Patent Office, Rijswijk, NL, 8 pgs.

ISA/EPO, International Search Report and Written Opinion of the International Searching Authority, Int'l Appl. No. PCT/US2015/045472, Jan. 15, 2016, European Patent Office, Rijswijk, NL, 23 pgs.

Xiao, "Performance Analysis of IEEE 802.11e EDCF under Saturation Condition," IEEE Communications Society; Jul. 2004, pp. 170-174, 0-7803-8533-0/04, 2004 IEEE International Conference on Communications.

* cited by examiner

ADAPTING BLIND RECEPTION DURATION FOR RANGE AND CONGESTION

FIELD OF THE DISCLOSURE

The following relates generally to wireless communication, and more specifically to adapting blind reception duration for range and congestion.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN), such as an IEEE 802.11 (i.e., Wi-Fi) network may include an access point (AP) that may communicate with one or more station (STAs) or mobile devices. The AP may be coupled to a wired network, such as the Internet, and may enable a mobile device to communicate via the network (and/or communicate with other devices coupled to the access point). A wireless device may communicate with a network device bi-directionally. For example, in a WLAN, a STA may communicate with an associated AP in downlink (DL) and uplink (UL) directions. The DL (or forward link) may refer to the communication link from the AP to the station, and the UL (or reverse link) may refer to the communication link from the station to the AP.

In some cases, a wireless station may enter a sleep state and awake periodically to receive beacons from an AP. If the beacon is not received, or expected content after the beacon (CAB) is not received, the station may wait for a designated period before re-entering the sleep state. If the designated period is not long enough, the station may miss a delayed transmission (i.e., the beacon or the CAB). Conversely, if the designated period is too long, the station may use more power, resulting in an unnecessary reduction of battery life.

SUMMARY

The present disclosure may relate generally to wireless communication systems, and more particularly to improved systems, methods, and/or apparatuses for adapting blind reception duration for range and congestion. A wireless station may measure channel conditions (e.g., range to an access point (AP) and channel congestion), and adjust one or more sleep timers based on the conditions. The sleep timers may each be associated with a window for reception of an expected transmission. If the transmission is not received in the window, the station may enter a sleep state to conserve power. In one example, a beacon miss timer is adjusted, and the expected wireless transmission is a delivery traffic indication message (DTIM). In another example, a content after beacon (CAB) timer is adjusted and the expected wireless transmission is the CAB. In some cases, the station may measure a delay for a number of beacons and determine the adjustment based on the delays.

A method of wireless communication at a UE is described. The method may include measuring a channel condition parameter for a wireless channel, adjusting a sleep timer based at least in part on the channel condition parameter, wherein the sleep timer is associated with a receive window of an expected wireless transmission, and entering a sleep state based at least in part on the adjusted sleep timer and an absence of the expected wireless transmission during the receive window.

An apparatus for wireless communication at a UE is described. The apparatus may include means for measuring a channel condition parameter for a wireless channel, means for adjusting a sleep timer based at least in part on the channel condition parameter, wherein the sleep timer is associated with a receive window of an expected wireless transmission, and means for entering a sleep state based at least in part on the adjusted sleep timer and an absence of the expected wireless transmission during the receive window.

A further apparatus for wireless communication at a UE is described. The apparatus may include a channel condition monitor to measure a channel condition parameter for a wireless channel, a sleep time adjuster to adjust a sleep timer based at least in part on the channel condition parameter, wherein the sleep timer is associated with a receive window of an expected wireless transmission, and a sleep state controller to enter a sleep state based at least in part on the adjusted sleep timer and an absence of the expected wireless transmission during the receive window.

A non-transitory computer-readable medium storing code for wireless communication at a UE is described. The code may include instructions executable to measure a channel condition parameter for a wireless channel, adjust a sleep timer based at least in part on the channel condition parameter, wherein the sleep timer is associated with a receive window of an expected wireless transmission, and enter a sleep state based at least in part on the adjusted sleep timer and an absence of the expected wireless transmission during the receive window.

In some examples of the method, apparatuses, and/or non-transitory computer-readable medium described above, the expected wireless transmission is a DTIM beacon and the sleep timer is a beacon miss timer. Additionally or alternatively, in some examples the expected wireless transmission is a CAB and the sleep timer is a CAB timer.

Some examples of the method, apparatuses, and/or non-transitory computer-readable medium described above may further include receiving a DTIM beacon with a CAB forecast, and initiating the CAB timer in response to receiving the DTIM beacon. Additionally or alternatively, some examples may include comparing the channel condition parameter to a congestion threshold.

In some examples of the method, apparatuses, and/or non-transitory computer-readable medium described above, adjusting the sleep timer comprises reducing the sleep timer based on a determination that the channel condition parameter satisfies the congestion threshold. Additionally or alternatively, in some examples adjusting the sleep timer comprises increasing the sleep timer based on a determination that the channel condition parameter does not satisfy the congestion threshold.

Some examples of the method, apparatuses, and/or non-transitory computer-readable medium described above may further include determining that a neighboring station is transmitting during a target beacon transmit time (TBTT), wherein the channel condition parameter is based at least in part on the determination. Additionally or alternatively, some examples may include measuring a set of delays comprising a delay for each beacon in a set of monitored beacons, and determining a systematic beacon offset based at least in part on the set of delays, wherein adjusting the sleep timer is based on the systematic beacon offset.

In some examples of the method, apparatuses, and/or non-transitory computer-readable medium described above, determining the systematic offset comprises determining that a measure of variation for the set of delays is less than a variation threshold. Additionally or alternatively, some examples may include determining whether to enter a sleep state at one or more fixed sleep timer intervals of the sleep timer.

In some examples of the method, apparatuses, and/or non-transitory computer-readable medium described above, adjusting the sleep timer comprises adding a next fixed sleep timer interval to the sleep timer based at least in part on a determination not to enter a sleep state at a previous fixed sleep timer interval of the one or more fixed sleep timer intervals. Additionally or alternatively, in some examples the measured channel condition parameter is one of a set of measured channel condition parameters associated with the one or more fixed sleep timer intervals, wherein adjusting the sleep timer is based on the set of measured channel condition parameters.

Some examples of the method, apparatuses, and/or non-transitory computer-readable medium described above may further include identifying a number of missed beacons from a past number of beacons, and adjusting the sleep timer comprises increasing the sleep timer based at least in part on an increase in the number of missed beacons. Additionally or alternatively, in some examples the channel condition parameter is associated with hidden node detection.

In some examples of the method, apparatuses, and/or non-transitory computer-readable medium described above, the channel condition parameter is based at least in part on an RSSI. Additionally or alternatively, in some examples the channel condition parameter is based at least in part on a range between the station and an AP.

Some examples of the method, apparatuses, and/or non-transitory computer-readable medium described above may further include measuring a consumed power during a beacon wake cycle, and generating a datum relating the consumed power consumption and the range.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
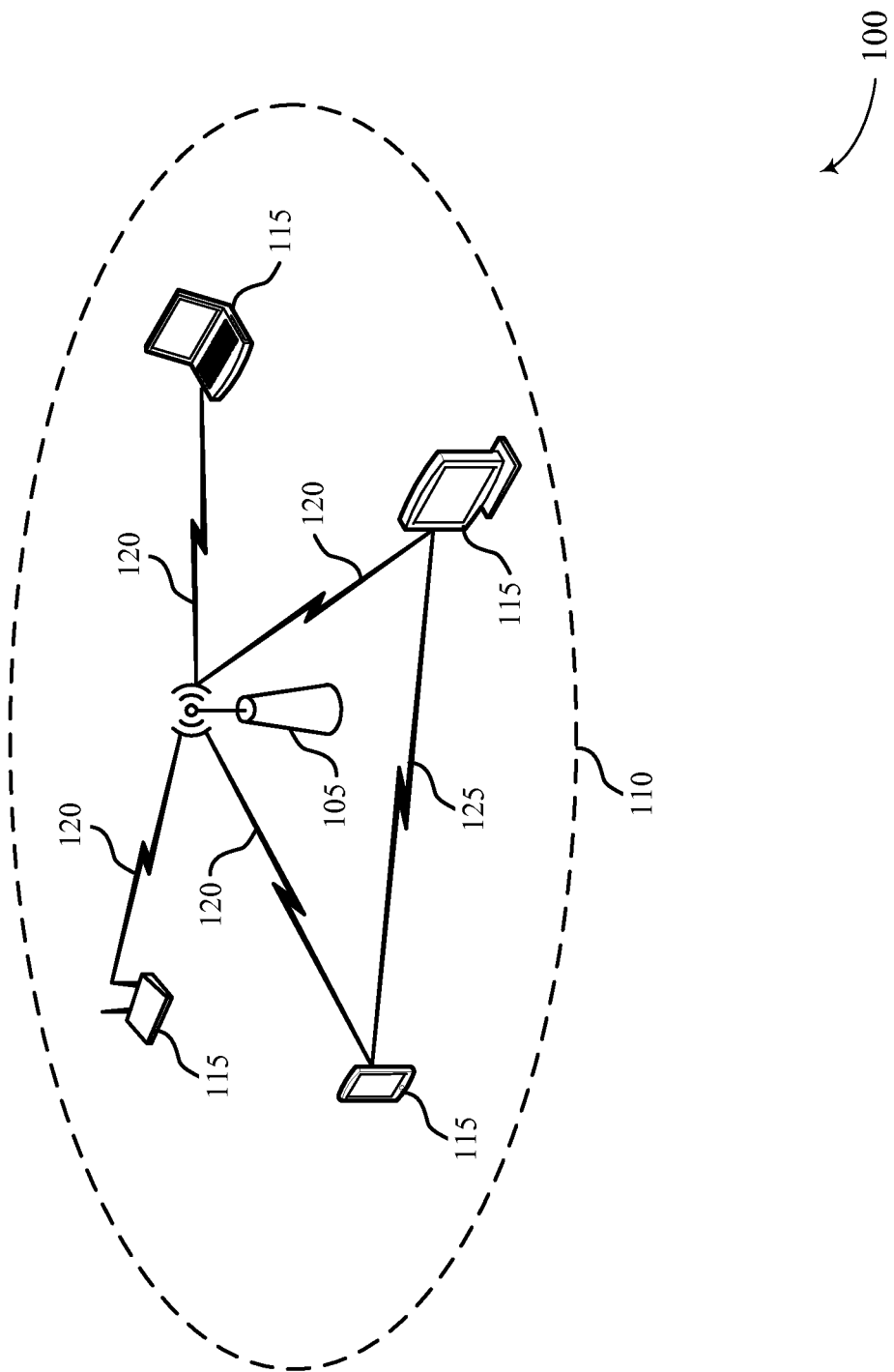
FIG. 1 illustrates a wireless local area network (WLAN) 100 (also known as a wireless fidelity (Wi-Fi) network) for adapting blind reception duration for range and congestion configured in accordance with various aspects of the present disclosure

The described features generally relate to improved systems, methods, and/or apparatuses for adapting blind reception duration for range and congestion. A wireless station may measure channel conditions (e.g., range to an access point (AP) and channel congestion), and adjust one or more sleep timers based on the conditions. The sleep timers may each be associated with a window for reception of an expected transmission. If the transmission is not received in the window, the station may enter a sleep state to conserve power. In one example, a beacon miss timer is adjusted, and the expected wireless transmission is a delivery traffic indication message (DTIM). In another example, a content after beacon (CAB) timer is adjusted and the expected wireless transmission is the CAB. In some cases, the station may measure a delay for a number of beacons and determine the adjustment based on the delays.

Thus, the station may dynamically adjust the sleep times to improve the likelihood of receiving a transmission (e.g., a DTIM or CAB) upon waking from a sleep state, as well as conserve power if it is determined that the transmission is not likely to come. That is, if the beacon is not received, or expected content after the beacon (CAB) is not received, the station may wait for an adjusted designated period before re-entering the sleep state. In cases when it is likely that the transmission is delayed (e.g., by channel congestion) then the station may wait longer for the transmission. In cases where it is likely that the transmission was missed (e.g., at long range or low congestion) the station may conserve power by returning to the sleep state early.

In some cases, a DTIM Power metric may be generated based on an ideal-case with limited channel congestion, a single STA-AP link, good signal strength, low noise and a reasonable AP that adheres to 20 ppm active clock drift. In this ideal mode, the dominant power consumption may be from the actual beacon reception duration (e.g., with early beacon termination) and the period that leads up to it. This period may include oscillating crystal settling, context restore duration in a power collapsed architecture, phase locked loop settling, and an early reception period to account for station clock drift). The minute details of this timeline may be optimized to improve a DTIM Power metric.

However, wireless stations may not operate in ideal environment. For example, there may be ambient congestion which prevents AP from sending beacon at the expected time; there may be shadowing, multipath, large scale fading, and other channel conditions that prevent the STA from receiving a beacon correctly (even if the AP actually sent it at the expected time); the temperature of the chipset in the STA may cause higher than expected drift of its low power clock such that the STA may wake up misaligned with the AP's clock; the AP may have a faulty clock or transmission logic resulting in delayed or erratic transmission of beacons; and there may be a hidden node in the vicinity of the AP generating congestion and preventing an AP's adherence to beacon transmission timing (even though the STA sees a clear channel).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates a WLAN 100 (also known as a Wi-Fi network) configured in accordance with various aspects of the present disclosure. The WLAN 100 may include an access point (AP) 105 and multiple associated station (STAs) 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various stations 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system (DS) that may allow multiple APs 105 to be connected in an ESS.

Although not shown in FIG. 1, a STA 115 may be located in the intersection of more than one coverage area 110 and may associate with more than one AP 105. A single AP 105 and a set of associated STAs 115 may be referred to as a BSS. An ESS is a set of connected BSSs. A distribution system (DS) (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections and/or ad hoc networks may be implemented within WLAN 100.

WLAN 100 may operate on two primary levels: the MAC of the data link layer and the PHY layer. The MAC sub-layer includes the distributed coordination function (DCF) and point coordination function (PCF). The DCF may be the basic access method, and may also be known as carrier sense multiple access with collision avoidance (CSMA/CA). In DCF, each STA 115 may access the network independently using a collision avoidance protocol. For example, a STA 115 may wait for a DCF inter-frame space (DIFS) plus a random backoff period prior to transmitting to check whether another STA 115 is using the channel. The DCF may be implemented in all STAs 115. PCF may be implemented in selected STAs 115. In PCF, a single AP 105 coordinates the access for other STAs 115. DCF and the PCF may operate concurrently within the same BSS. For example, the two access methods may alternate, with a contention free period (CFP) for PCF followed by a contention period (CP) for DCF. A hybrid coordination function (HCF) may also be used, in which different traffic types are assigned different access priorities.

An AP 105 may periodically transmit a frame known as a beacon that may contain information related to the network. For example, the beacon may contain a timestamp for synchronization, an interval indicating the periodicity of the beacon (and thus the TBTT), information related to the capabilities of the network, a service set identifier (SSID), supported rates, frequency hopping parameters, direct-sequence parameters, contention-free access parameters, independent basic service set (IBSS) parameters, and a traffic indication message (TIM). A TIM may indicate to client STAs 115 whether the AP 105 has buffered frames waiting for them. In some cases, the beacon may also contain a delivery traffic indication message (DTIM), which may inform client STAs 115 about pending broadcast or multicast transmissions, known as the content after beacon (CAB). After the DTIM beacon, the AP 105 may transmit the indicated data using CSMA/CA. In some cases, STAs 115 may enter a sleep mode between beacon transmissions to conserve power.

If a STA 115 enters a sleep mode, the STA 115 may wake periodically to receive a beacon (which may include a DTIM). The STA 115 may wake sufficiently early to activate the radio components used for beacon reception. In some cases, the STA 115 may also wake early to account for possible timing synchronization with the AP 105. If the beacon is not received at the expected time, the STA 115 may wait for a beacon miss timer to expire. If a beacon containing a DTIM is received, the STA 115 may then wait for the indicated transmission until a CAB timer expires. If either timer expires, the STA 115 may re-enter sleep mode and wait for the next anticipated beacon.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive each other's transmissions. This condition may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, in some cases utilizing RTS/CTS may help mitigate a hidden node problem.

According to the present disclosure, a STA 115 may measure channel conditions and decrease one or more sleep timers based on the conditions. The sleep timers may each be associated with a window for reception of an expected transmission. If the transmission is not received in the window, the station may enter a sleep state to conserve power.

Figure 2A:
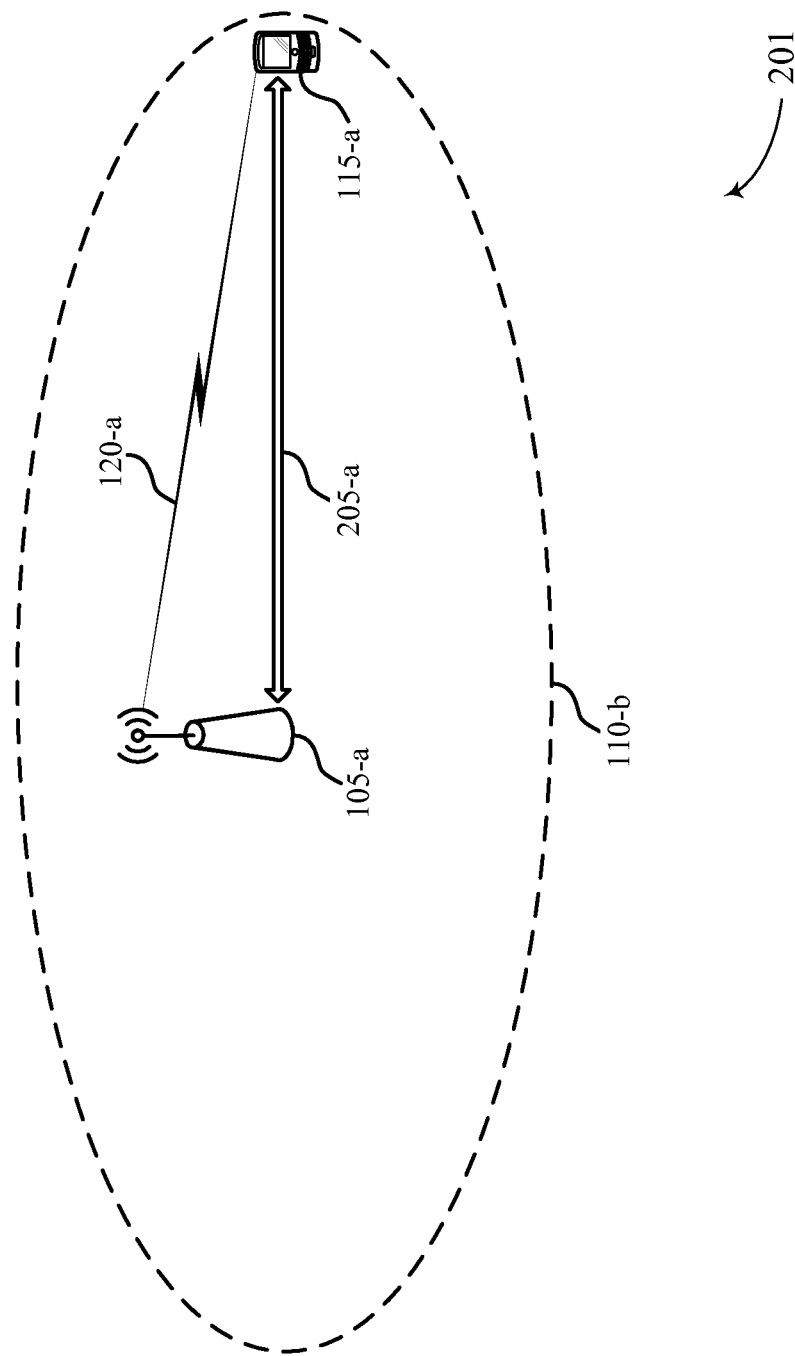
FIG. 2A illustrates an example of a wireless communication subsystem for adapting blind reception duration for range and congestion in accordance with various aspects of the present disclosure.

FIG. 2A illustrates an example of a wireless communication subsystem 201 for adapting blind reception duration for range and congestion in accordance with various aspects of the present disclosure. Wireless communication subsystem 201 may include a STA 115-a, which may be an example of a STA 115, and an AP 105-a which may be an example of an AP 105, both of which are described above with reference to FIG. 1. Wireless communication subsystem 201 may also include a wireless link 120-a, coverage area 110-a and a range 205-a between AP 105-a and STA 115-a.

Wireless communication subsystem 201 may represent a case in which the range 205-a between STA 115-a and AP 105-a is relatively large. For example, the range 205-a may result in a signal attenuation of greater than 80 decibels (dB). In some cases, a range threshold may depend on the capabilities of STA 115-a and/or AP 105-a. As range 205-a is increased from STA 115-a to AP 105-a, RSSI and SNR may dominates beacon reception success and may progressively increases a beacon miss rate.

Thus, the signal attenuation that results from the range 205-a may decrease the likelihood that STA 115-a will successfully receive transmissions from AP 105-a. Thus, if a transmission is missed, STA 115-a may infer that the missed transmission is due to the range 205-a and not due to channel congestion (which could cause a delay in the transmission). This inference may enable STA 115-a to reduce the length of a beacon miss timer or a CAB timer (i.e., return to a sleep state earlier) without significantly impacting the likelihood that STA 115-a will receive any transmissions directed toward the STA 115-a.

Thus, STA 115-a may measure channel conditions and decrease one or more sleep timers based on suboptimal conditions (e.g., a large range 205-a to an AP, or a degraded received signal strength indication (RSSI) associated with the range 205-a). The sleep timers may each be associated with a window for reception of an expected transmission. If the transmission is not received in the window, the station may enter a sleep state to conserve power. In certain examples, a suboptimal condition may construed based on the past several successfully received beacons. In such examples, the current beacon (i.e., the beacon that was missed) may not contribute to the RSSI/SNR estimate of the link.

Figure 2B:
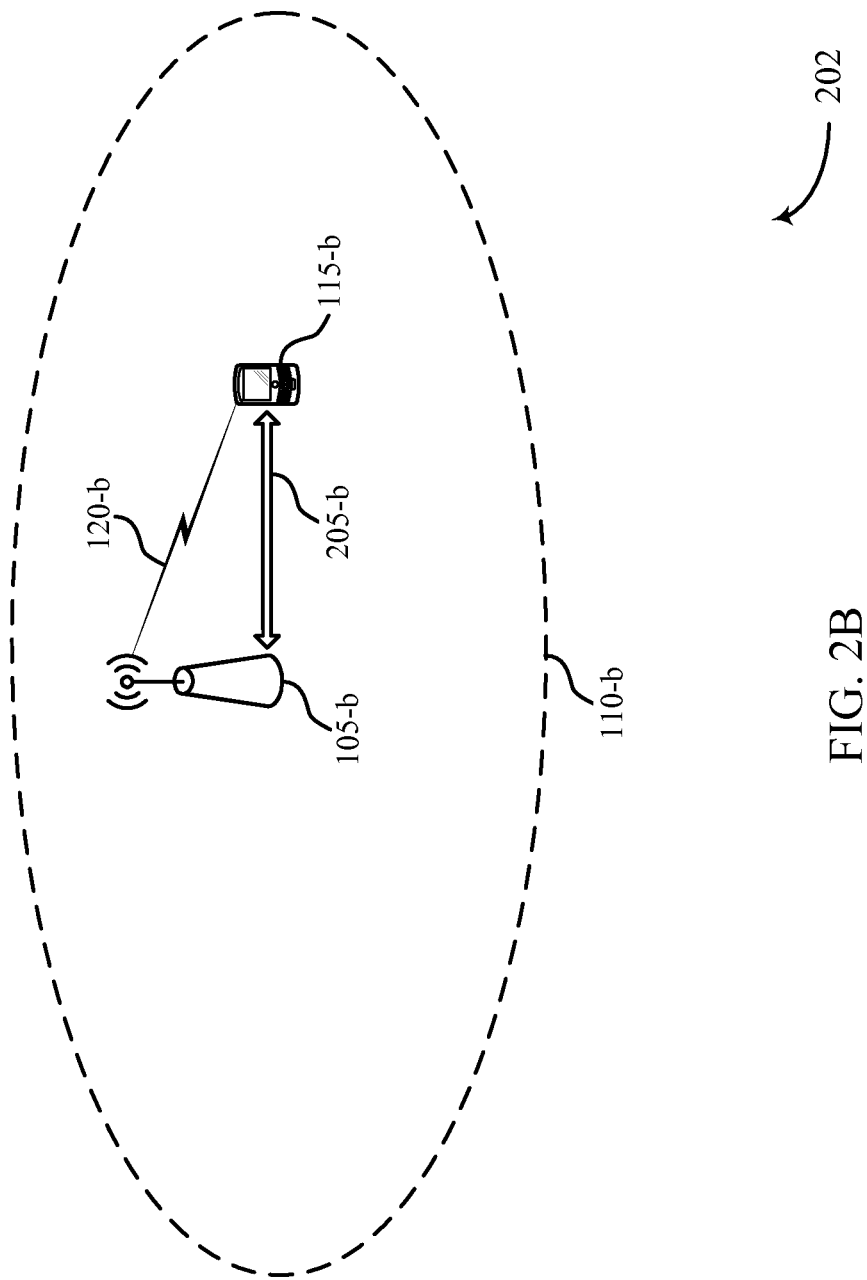
FIG. 2B illustrates an example of a wireless communication subsystem for adapting blind reception duration for range and congestion in accordance with various aspects of the present disclosure.

FIG. 2B illustrates an example of a wireless communication subsystem 202 for adapting blind reception duration for range and congestion in accordance with various aspects of the present disclosure. Wireless communication subsystem 202 may include a STA 115-b which may be an example of a STA 115, and an AP 105-b which may be an example of an AP 105, both of which are described above with reference to FIG. 1. Wireless communication subsystem 202 may also include a wireless link 120-b, coverage area 110-b and a range 205-b between AP 105-b and STA 115-b.

Wireless communication subsystem 202 may represent a case in which the range 205-b between STA 115-b and AP 105-b is relatively small. For example, the range 205-b may result in a signal attenuation of less than a threshold number of decibels (dB) to enable sufficiently reliable signal decoding. In some cases, a range threshold may depend on the capabilities of STA 115-b and/or AP 105-b. Wireless communication subsystem 202 may also represent a case in which channel congestion is low (e.g., as measured by the presence of transmissions form other STAs 115). The relatively low signal attenuation that results from the range 205-b as well as the low channel congestion may increase the likelihood that STA 115-b will successfully receive transmissions from AP 105-b. Thus, if a transmission is not received at the expected time, STA 115-b may infer that it is not due to the range 205-b and not due to channel congestion (which could cause a delay in the transmission). For example, a beacon may have been missed while STA 115-*b* was in a sleep state. This may indicate a clock synchronization problem, and STA 115-*b* may reduce the length of a beacon miss timer or a CAB timer (i.e., return to a sleep state earlier) without significantly impacting the likelihood that STA 115-*b* will receive any transmissions directed toward it. In this case, STA 115-*b* may add additional time to an early reception period for reception of subsequent beacons (described below with reference to FIG. 3).

Thus, STA 115-*b* may measure channel conditions and decrease one or more sleep timers based on being at a close range with low congestion. In some cases, a beacon miss timer may be reduced while a CAB timer may not be reduced because the CAB timer may correspond to a DIFS-based contention access of the CAB data, such that the corresponding delay may be longer than that of a prioritized beacon transmission. The sleep timers may each be associated with a window for reception of an expected transmission. If the transmission is not received in the window, the station may enter a sleep state to conserve power.

Figure 2C:
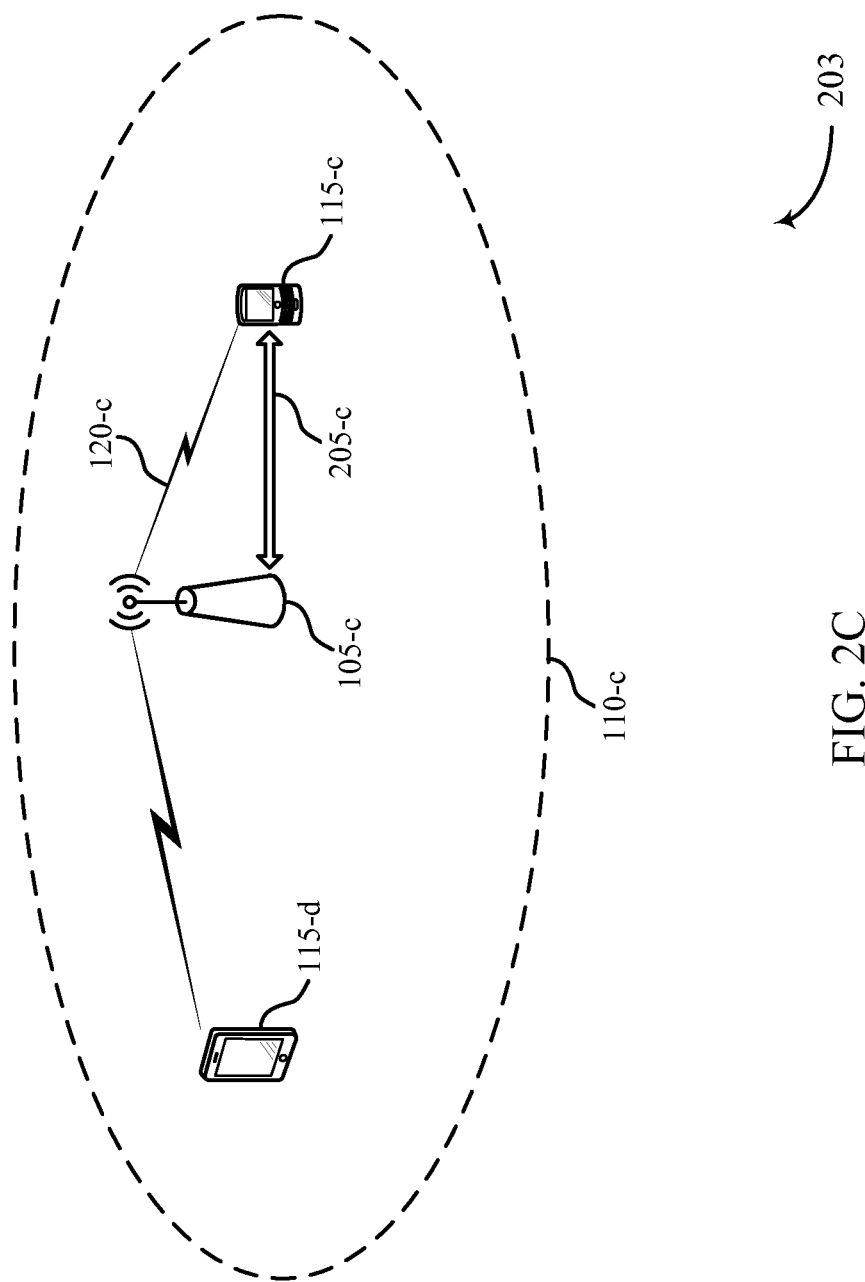
FIG. 2C illustrates an example of a wireless communication subsystem for adapting blind reception duration for range and congestion in accordance with various aspects of the present disclosure.

FIG. 2C illustrates an example of a wireless communication subsystem 203 for adapting blind reception duration for range and congestion in accordance with various aspects of the present disclosure. Wireless communication subsystem 203 may include STAs 115-*c* and 115-*d* which may be examples of a STA 115, and an AP 105-*c* which may be an example of an AP 105, both of which are described above with reference to FIG. 1. Wireless communication subsystem 203 may also include a wireless link 120-*c*, coverage area 110-*c* and a range 205-*cb* between AP 105-*c* and STA 115-*c*.

Wireless communication subsystem 203 may represent a case in which the range 205-*c* between STA 115-*c* and AP 105-*c* is relatively small. For example, the range 205-*b* may result in a signal attenuation of less than 80 decibels (dB). In some cases, a range threshold may depend on the capabilities of STA 115-*c* and/or AP 105-*c*. Wireless communication subsystem 203 may also represent a case in which channel congestion is high (e.g., as measured by the presence of transmissions form other STAs 115 such as STA 115-*d*). For example, the STA 115-*c* may measure of external band (e.g., industrial, scientific and medical (ISM) band) energy and WiFi Frame activity. The combination the two over the measurement period may provide ambient channel congestion due to noise and ambient WLAN traffic, not directed to STA 115-*c*. In some cases, channel congestion may be computed over each awake interval and averaged over time using a 1-tap infinite impulse response (IIR) filter. A channel congestion parameter may be generated by combining current and average channel congestion:

Average Channel Congestion=Current channel congestion+α*(Average channel congestion)   (1)

where α determines the how quickly the STA 115-*c* should adapt to changing channel conditions.

In some examples, STA 115-*d* may be a hidden node, such that transmissions by STA 115-*d* are not directly detectable by STA 115-*c* and vice versa. In some cases, STA 115-*c* may use hidden node detection techniques to determine whether a hidden node is interfering with communication with AP 105-*c*. In another case, STA 115-*d* may be a rogue station that may transmit during the target beacon transmit time (TBTT) usually reserved for broadcast transmissions from AP 105-*c*. In some cases, a hidden node or a rogue station may cause a systematic delay in beacon transmissions by AP 105-*c*. Thus, according to the current disclosure power consumption may be improved by reducing the timeout duration for beacon and CAB detection. Reliability of the link may also be improved by increasing the timers in certain conditions (e.g., in the presence of a rogue station or a detected hidden node).

The relatively low signal attenuation that results from the range 205-*c*, in combination with a state of high channel congestion, may increase the likelihood that transmissions from AP 105-*c* may be delayed, but that waiting for a longer time period may allow STA 115-*c* to successfully receive the transmissions. Thus, if a transmission is not received, STA 115-*c* may infer that it may be delayed due to channel congestion. For example, AP 105-*c* may wait to transmit until STA 115-*d* has completed a transmission. Thus, in some cases STA 115-*c* may increase the length of a beacon miss timer or a CAB timer (i.e., delay returning to a sleep state longer) to improve the likelihood that the associated transmissions from AP 105-*c* may be successfully received.

Thus, STA 115-*c* may measure channel conditions and decrease one or more sleep timers based on being at a close range with low congestion. In some cases, a beacon miss timer may be reduced while a CAB timer may not be reduced because the CAB timer may correspond to a DIFS-contention based access period during which a delay may be normal. The sleep timers may each be associated with a window for reception of an expected transmission. If the transmission is not received in the window, the station may enter a sleep state to conserve power.

Figure 3:
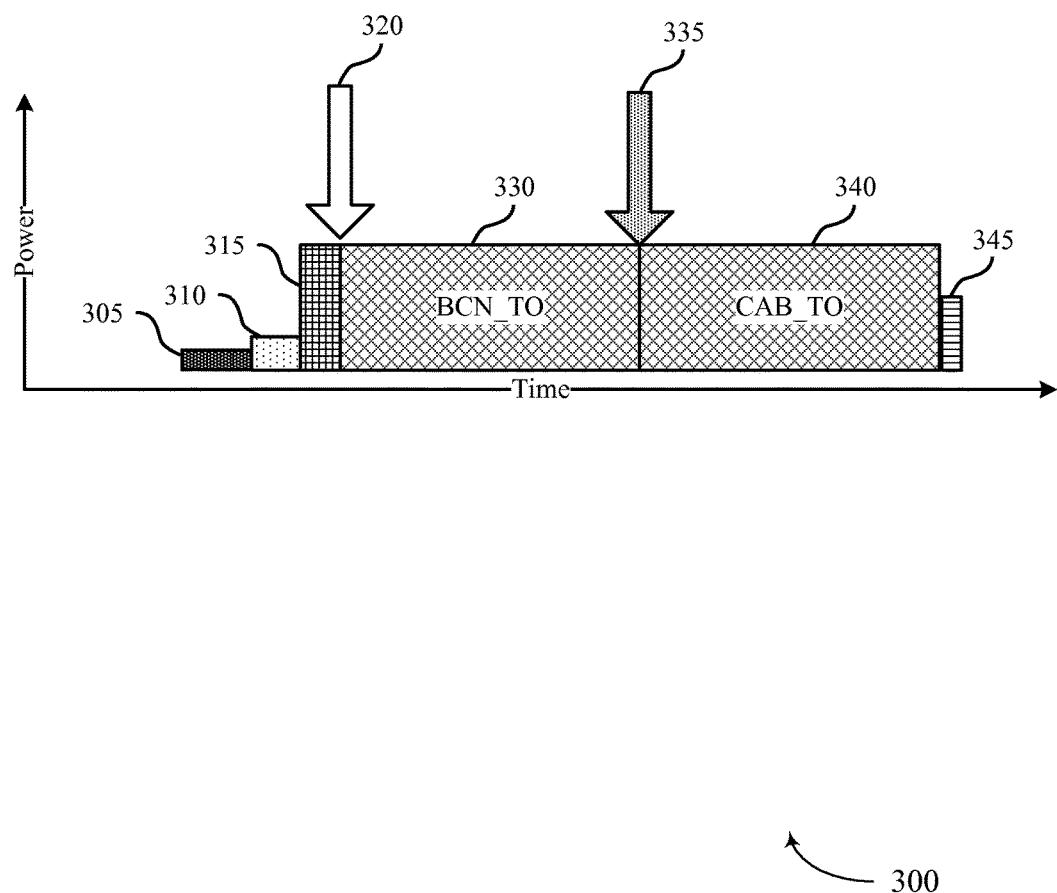
FIG. 3 illustrates an example of a timing diagram for adapting blind reception duration for range and congestion in accordance with various aspects of the present disclosure.

FIG. 3 illustrates an example of a timing diagram 300 for adapting blind reception duration for range and congestion in accordance with various aspects of the present disclosure. Timing diagram 300 may represent a timeline for a STA 115 that wakes to receive a DTIM from an AP 105. For example, timing diagram 300 may represent a waking period for a STA 115 as described above with reference to FIGS. 1, 2A, 2B, and 2C. The horizontal axis of timing diagram 300 may represent the flow of time, and the vertical axis of timing diagram may represent the rate of power consumption by each of the actions represented. Thus, the area of each rectangular segment may represent the total power consumed by the operation.

Timing diagram 300 may include a first warm-up period 305 during which a STA 115 may wake prior to receiving an expected DTIM to ensure the availability of a reference clock (for example, a crystal oscillator may need time to settle). First warm-up period 305 may involve a relatively small amount of power consumption. Second warm-up period 310 may represent a period of time during which a STA 115 activates components of a processor and/or radio components in preparation for receiving a beacon. Early reception period 315 may be an early buffer period during which a STA 115 is prepared to receive a beacon early in case the clock of the STA 115 is not synchronized with the clock of the AP 105. That is, the STA 115 may wake up earlier than otherwise (according to its internal clock) because the clock may be running late. A STA 115 may consume more power during early reception period 315 than during first warm-up period 305 or second warm-up period 310 because the STA 115 may be fully ready to receive.

Beacon period 320 may represent the time at which a STA 115 expects to receive a beacon (e.g., a beacon containing a DTIM). At or near beacon period 320, a STA 115 may initiate a beacon timer interval 330. The beacon timer interval 330 may last until a beacon is received or until a beacon miss timer expires. In some examples, the beacon timer may be set to 10 ms to allow for a delayed beacon. According to the present disclosure, the default period may be adjusted based on conditions. In the case illustrated by timing diagram 300, the beacon is received at beacon reception period 335 prior to the expiration of the beacon miss timer. In some cases, the beacon is not received during this window and the STA 115 may then return to a sleep state.

If the beacon is received prior to the expiration of the beacon miss timer as illustrated (and the beacon contains a DTIM), the STA 115 may initiate a CAB timer for CAB timer interval 340. The STA 115 may be fully ready to receive transmissions during beacon timer interval 330 and CAB timer interval 340. Furthermore, these periods may last for a significantly longer timer than the first warm-up period 305, the second warm-up period 310, or the early reception period 315. Thus, in some cases a STA 115 may consume significantly more power during the beacon timer interval 330 and/or the CAB timer interval 340 than during the first warm-up period 305, the second warm-up period 310, or the early reception period 315 combined.

The CAB timer interval 340 may last until the CAB is received or until the CAB timer expires. In the case illustrated by timing diagram 300, the CAB is not received and the STA 115 returns to a sleep state. In order to return to the sleep state, A STA 115 may save the state of a processor and shut down one or more radio components during state save period 345. In some cases, the CAB is received during this window and the STA 115 may decode the CAB prior to reentering the sleep state.

Thus, a STA 115 may measure channel conditions (e.g., range to an access point (AP) and channel congestion), and adjust a beacon miss timer and/or a CAB timer based on the conditions. The beacon miss timer may be associated with beacon timer interval 330, and the CAB timer may be associated with CAB timer interval 340 during which the STA 115 may receive the corresponding a beacon or CAB, respectively. If the transmission is not received in the corresponding window, the STA 115 may enter a sleep state to conserve power.

Figure 4:
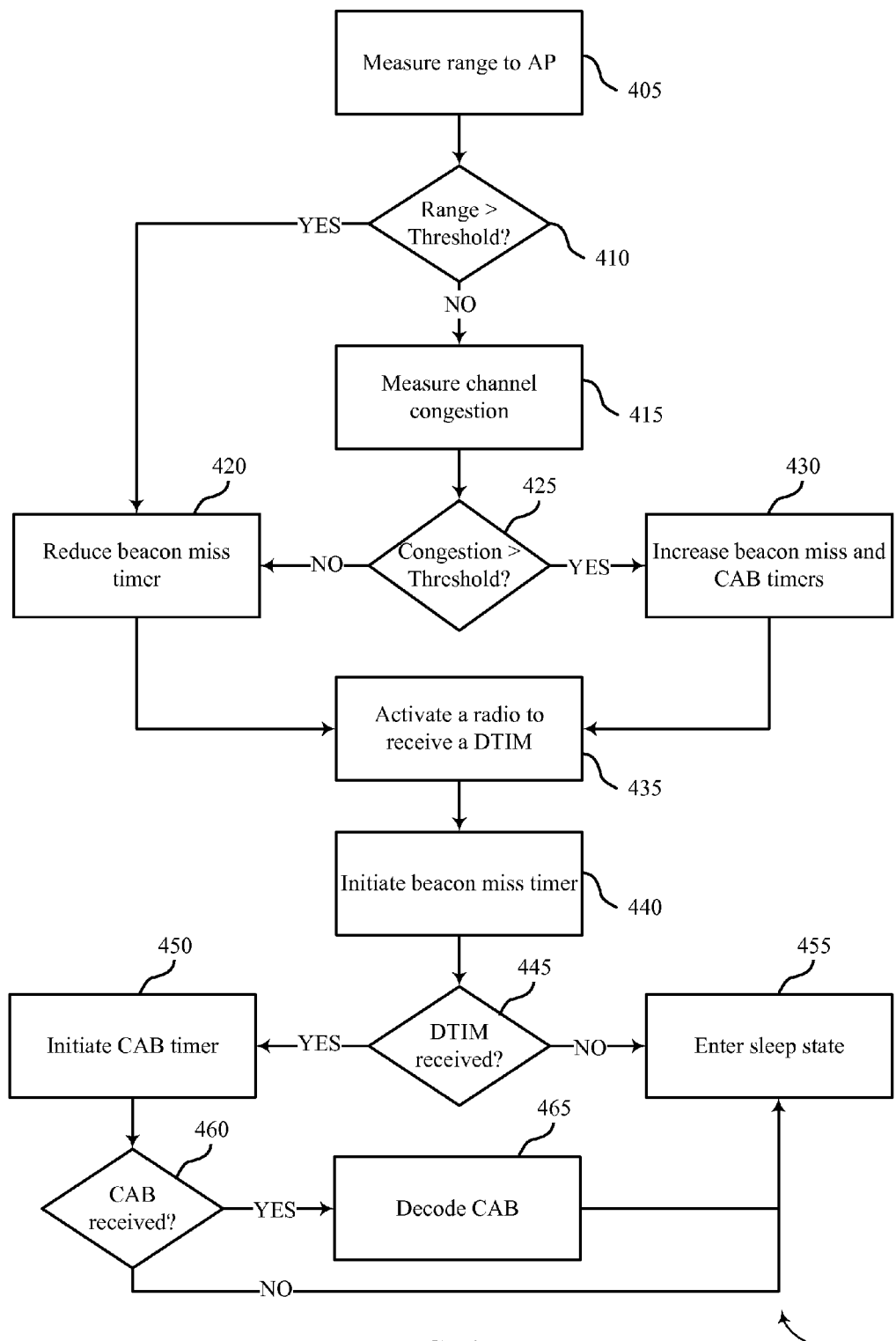
FIG. 4 illustrates an example of a decision process for adapting blind reception duration for range and congestion in accordance with various aspects of the present disclosure.

FIG. 4 illustrates an example of a decision process 400 for adapting blind reception duration for range and congestion in accordance with various aspects of the present disclosure. Decision process 400 may be performed by a STA 115 waking from a sleep state for a beacon transmission as described above with reference to FIG. 1-3.

At the beginning of decision process 400, the STA 115 may measure one or more channel condition parameters for a wireless channel. For example, at block 405 the STA 115 may determine a range 205 to an AP 105. In some cases, the range 205 may correspond to a level of signal attenuation. At block 410, the range 205 may be compared to a threshold.

If the range 205 is greater than the threshold, at block 415 the STA 115 may reduce a beacon miss timer. If the range 205 is less than the threshold, at block 420 the STA 115 may identify a channel congestion parameter. In some cases, identifying the channel congestion parameter may include determining whether a rogue STA 115 or a hidden node is interfering with transmissions. For example, the STA 115 may determine that a neighboring station may be transmitting during a TBTT, and the channel condition parameter may be based on this determination. In some cases, this determination is made a priori (i.e., before the other the steps illustrated decision process 400).

At block 425, the STA 115 may compare the channel congestion to a threshold. If the congestion is greater than the threshold, at block 430 the STA 115 may increase a beacon miss timer and/or a CAB timer. If the congestion is less than the threshold the STA 115 may reduce the beacon miss timer. In some cases, determining that the channel congestion is greater than the threshold may comprise determining that there is a high likelihood of an interfering hidden node or rogue STA 115.

In some cases, STA 115-c may not reduce a beacon miss timer in the case where ambient congestion is lower than a threshold because a beacon may be delayed due to ongoing WiFi traffic by a "rogue" non-AP STA 115 transmitting during the TBTT. In some cases, this may last up to a maximum transmit opportunity period. In one embodiment, STA 115 may detect a rogue STA 115 by observing a hiatus in the ongoing transmission and then observing the nature of traffic after at least a point coordination function inter-frame space (PIFS) duration; if the AP 105 is unable to send the beacon, it may do so after a prioritized PIFS duration, whereas other non-AP STAs 115 may commence data transfer after at least a short inter-frame space (SIFS) duration.

In some cases, STA 115 may implement multiple conditions to determine whether to adjust the beacon miss timer. For example, according to a first condition, if ambient congestion is less than a threshold, the STA 115 may decide to reduce or cancel the beacon miss timer to enter a low power mode earlier. In another case, the STA 115 may decide to qualify the first condition. For example, if the average RSSI (measured until the last successfully received beacon) is less than a threshold, the STA 115 may decide to set the beacon miss timer at ½, ¼ or some other fractional value of a default beacon miss timer value (e.g., 10 ms), and enter low power mode earlier.

In some cases, STA 115 may determine that ambient congestion is greater than a threshold, a rogue station is detected and no beacon is received after PIFS. The STA 115 may determine that there is no beacon to be received and may decide to cancel or reduce the beacon miss timer and enter low power mode. For example, a device may detect whether non-beacon Wi-Fi traffic is observed after the first transmission over TBTT within a short inter-frame space (SIFS) duration, but before PIFS expiration. If so, it may be determined that the non-AP STA 115 is engaged in a SIFS-burst transmission. In this case, STA 115 may not reduce a sleep timer. In some cases, STA 115 may to increase the beacon miss timer (e.g., beyond 10 ms) until the high RSSI and low ambient congestion is detected.

If the STA 115 determines there is a hidden node in the vicinity of the AP 105-c (especially in the case that ambient congestion is low and RSSI is high), the STA 115-c may maintain or increase the beacon miss timer to improve chances of beacon. The conditions described above are examples, and these conditions and additional conditions not described may be utilized together in various combinations.

Multiple conditions may also be used to adjust the CAB timer. In some cases, the CAB timer conditions may be different from the beacon miss timer conditions. For example, in one CAB timer condition, if ambient congestion is less than a minimum congestion threshold for a certain number of 1 ms evaluation timer slices, a STA 115 may determine that the AP 105 has no CAB data to send and the STA and may cancel or reduce the CAB timer and enter a low power mode. In another example condition, if average RSI is greater than a threshold a STA 115 may identify the possibility of a channel induced data loss and cancel or reduce the CAB timer earlier, at ½ or ¼ or some other fractional value.

In another example condition, any of the previously mentioned conditions may be preempted to prevent the cancellation of a CAB timer. In some cases, the STA 115 may not reduce the CAB timer if ambient congestion is greater than a congestion threshold as the AP 105 may need to contend for the channel like a non-AP STA 115, and the minimum separation between beacon transmission and CAB transmission may be limited DIFS. In some cases, another STA 115 may win the channel before the AP 105 does in a contention based procedure. As a result, CAB transmission may be delayed. If the AP 105 does win the channel, it may immediately transmit the CAB. If the AP 105 wins the channel and does not transmit CAB, the STA 115 may infer that there is no CAB to transmit (even if the AP 105 advertised CAB data by sending a DTIM).

In some cases, if a STA 115 receives a DTIM Beacon with a CAB forecast and ambient congestion is greater than a threshold and a non-CAB transmission from an AP 105 is detected after DIFS, the STA 115 may cancel the CAB timer and enter a low power mode early. A hidden node consideration may be used as well. For example if a DTIM Beacon with CAB forecast is received and ambient congestion is less than a minimum threshold and a hidden node is detected, the STA 115 may adheres to the full CAB (or increase the timer) and may not enter sleep early.

At block 435, the STA 115 may activate processor and radio components in preparation to receive a beacon containing a DTIM. At the expected time for receiving the beacon, at block 440 the STA 115 may initiate a beacon miss timer.

At block 445, the STA 115 may determine whether the beacon containing the DTIM has been received. If the beacon has not been received by the end of the adjusted beacon timer interval 330, the STA 115 may reenter the sleep state at block 455.

At block 450, if the beacon is received with a DTIM (forecasting a subsequent transmission of CAB data), the STA 115 may wait for an expected CAB transmission and initiate a CAB timer (which may also be adjusted based on the channel conditions). At block 460, the STA 115 may determine whether the CAB has been received prior to the end of the CAB timer interval 340. At block 465, if the CAB has been received, the STA 115 may decode the CAB and perform any other relevant actions prior to reentering a sleep state at block 455. If the CAB is not received, the STA 115 may reenter the sleep state directly at block 455. Thus, STA 115 may enter a sleep state based on the adjusted sleep timer and an absence of an expected wireless transmission during the relevant receive window.

In some cases, in addition to measuring the most recent channel conditions, a STA 115 may measure a set of delays covering several subsequent beacon transmissions. The STA 115 may then determine a systematic beacon offset based delays, and adjust a sleep timer is based on the systematic beacon offset. For example, the STA 115 may determine that a measure of variation for the delays is less than a variation threshold, which may indicate systematic delay. In this case, starting an adaptive beacon miss timer during a first evaluation interval (e.g., of duration 2 ms) may lead to missed transmissions. Thus, a STA 115 may start the adaptive congestion evaluation after a fixed offset. To do so, it may monitor a set of beacon receptions and keep a record of the difference between when the beacon actually arrives and when it was expected to arrive. The STA 115 may then use post-processing and pattern-matching logic to determine out if there is a systematic offset present. That is, if a systematic offset is present, the STA 115 may shift the congestion evaluation logic back by the offset period.

In some cases, the STA 115 may determine whether to enter a sleep state at fixed intervals (e.g., every 2 ms). Then the STA 115 may add another fixed sleep timer interval to the sleep timer based if it determines not to enter a sleep state at the previous fixed sleep timer interval. In some examples a set of measured channel condition parameter values may be mapped to a set of fixed sleep timer intervals, adjusting the sleep timer may include identifying the sleep timer interval based on the mapping. In some cases, a STA may wait for a certain number of fixed intervals (e.g., three intervals=6 ms) before beginning a congestion evaluation. In some cases, the STA 115 may evaluate congestion during the last few fixed offset intervals to aid in making congestion determinations. A different congestion evaluation may be made in each interval and they may be averaged or combined in some other way (such as with a weighted average giving more weight to recent measurements)

In some examples, the STA 115 may count the number of missed beacons from certain number of past beacons. Then adjusting the sleep timer may include increasing the sleep timer if the number of missed beacons goes up and decreasing the sleep timer if the number of missed beacons goes down. In some cases, the STA 115 may adjust a current beacon miss timer during the present wake period. In other cases, the STA 115 may adjust the next beacon miss timer (that is, for the next beacon reception period as opposed to the timer for a current beacon reception period).

In some cases, the STA 115 may measure the consumed power during a beacon wake cycle to generate data relating power consumption, range, and channel congestion. For example, this data may be used for updating the timer adjustment algorithm or for displaying the relationship to one or more users of the device.

Figure 5:
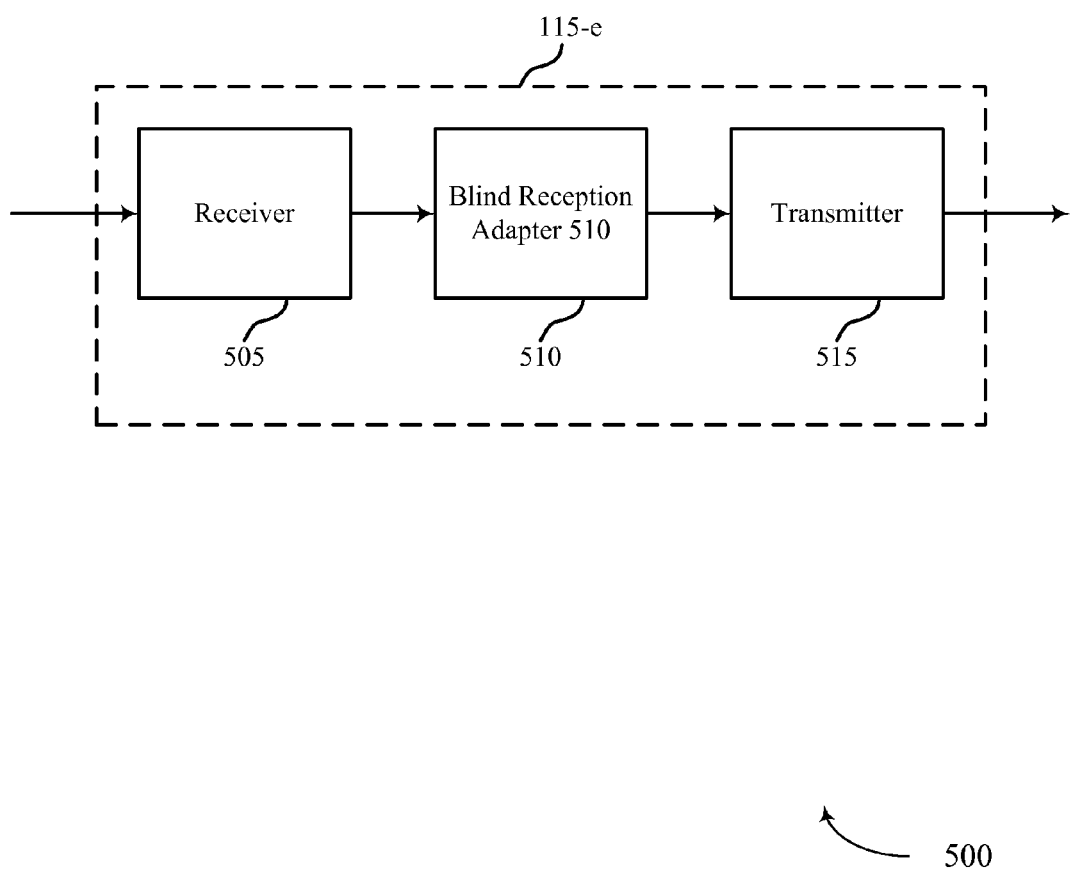
FIG. 5 shows a block diagram of a device for adapting blind reception duration for range and congestion in accordance with various aspects of the present disclosure.

FIG. 5 shows a block diagram 500 of a STA 115-*e* for adapting blind reception duration for range and congestion in accordance with various aspects of the present disclosure. The STA 115-*e* may be an example of aspects of a STA 115 described with reference to FIGS. 1-4. The STA 115-*e* may include a receiver 505, a blind reception adapter 510, and/or a transmitter 515. The STA 115-*e* may also include a processor. Each of these components may be in communication with each other.

The components of the STA 115-*e* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, and/or beacons associated with various information channels (e.g., control channels, data channels, and information related to adapting blind reception duration for range and congestion, etc.). Information may be passed on to the blind reception adapter 510, and to other components of the STA 115-*e*. In some examples, the receiver 505 may receive a DTIM.

The blind reception adapter 510 may measure a channel condition parameter for a wireless channel, adjust a sleep timer based at least in part on the channel condition parameter, wherein the sleep timer is associated with a receive window of an expected wireless transmission, and enter a sleep state based at least in part on the adjusted sleep timer and an absence of the expected wireless transmission during the receive window.

The transmitter 515 may transmit signals received from other components of the STA 115-*e*. In some embodiments, the transmitter 515 may be collocated with the receiver 505 in a transceiver module. The transmitter 515 may include a single antenna, or it may include a plurality of antennas.

Figure 6:
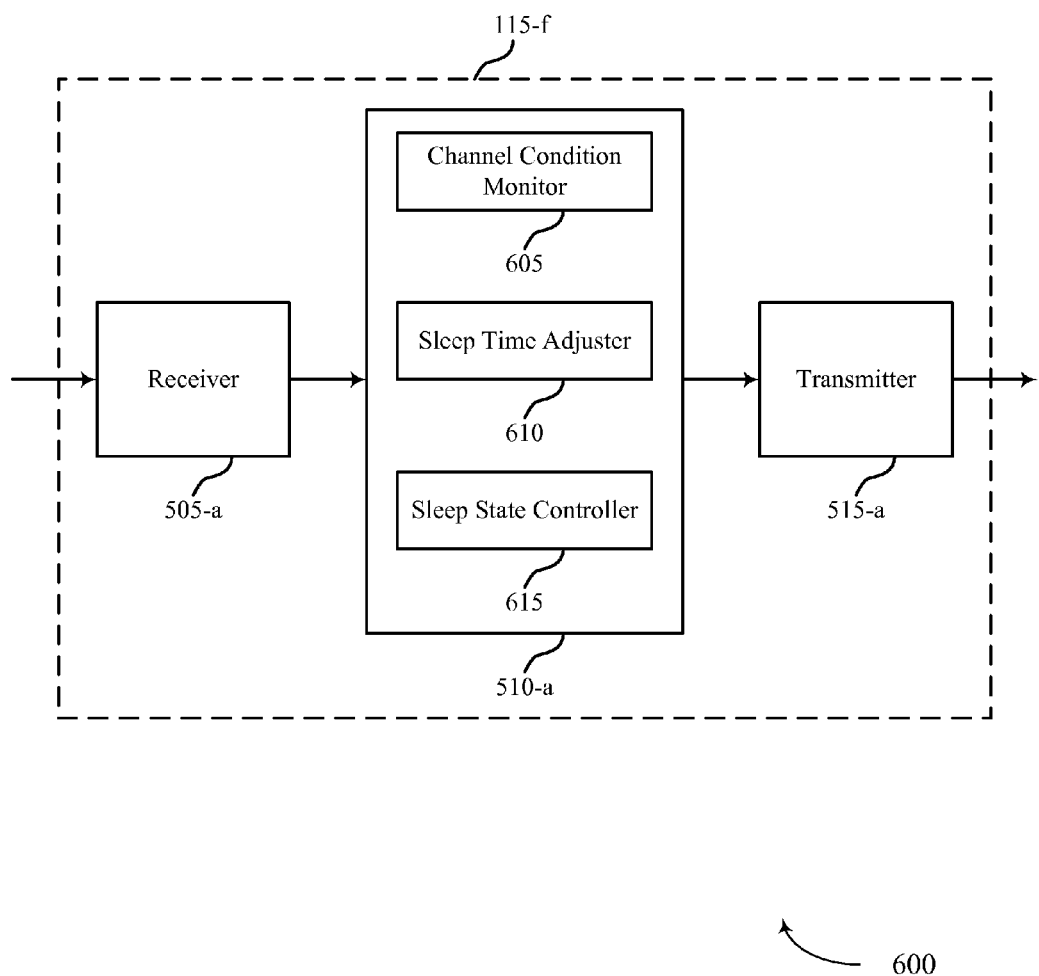
FIG. 6 shows a block diagram of a device for adapting blind reception duration for range and congestion in accordance with various aspects of the present disclosure.

FIG. 6 shows a block diagram 600 of a STA 115-*f* for adapting blind reception duration for range and congestion in accordance with various aspects of the present disclosure. The STA 115-*f* may be an example of aspects of a STA 115 described with reference to FIGS. 1-5. The STA 115-*f* may include a receiver 505-*a*, a blind reception adapter 510-*a*, and/or a transmitter 515-*a*. The STA 115-*f* may also include a processor. Each of these components may be in communication with each other. The blind reception adapter 510-*a* may also include a channel condition monitor 605, a sleep time adjuster 610, and a sleep state controller 615.

The components of the STA 115-*f* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to the -*a*, and to other components of the STA 115-*f*. The blind reception adapter 510-*a* may perform the operations described above with reference to FIG. 5. The transmitter 515-*a* may transmit signals received from other components of the STA 115-*f*.

The channel condition monitor 605 may measure a channel condition parameter (e.g., a range to an AP 105, channel congestion, or RSSI, etc.) for a wireless channel as described above with reference to FIGS. 2-4. In some examples, the measured channel condition parameter may be one of a set of measured channel condition parameters associated with the one or more fixed sleep timer intervals, and wherein adjusting the sleep timer may be based on the set of measured channel condition parameters. In some examples, the channel condition parameter may be associated with hidden node or rogue station detection.

The sleep time adjuster 610 may adjust a sleep timer (e.g., a beacon miss timer or a CAB timer) based at least in part on the channel condition parameter, wherein the sleep timer is associated with a receive window of an expected wireless transmission as described above with reference to FIGS. 2-4. In some examples, adjusting the sleep timer comprises reducing the sleep timer based on a determination that the channel condition parameter satisfies the congestion threshold. In some examples, adjusting the sleep timer comprises increasing the sleep timer based on a determination that the channel condition parameter does not satisfy the congestion threshold. In some examples, adjusting the sleep timer comprises adding a next fixed sleep timer interval to the sleep timer based at least in part on a determination not to enter a sleep state at a previous fixed sleep timer interval of the one or more fixed sleep timer intervals. In some examples, adjusting the sleep timer comprises increasing the sleep timer based at least in part on an increase in the number of missed beacons.

The sleep state controller 615 may enter a sleep state based at least in part on the adjusted sleep timer and an absence of the expected wireless transmission during the receive window as described above with reference to FIGS. 2-4. The sleep state controller 615 may also determine whether to enter a sleep state at one or more fixed sleep timer intervals of the sleep timer as described above with reference to FIGS. 2-4.

Figure 7:
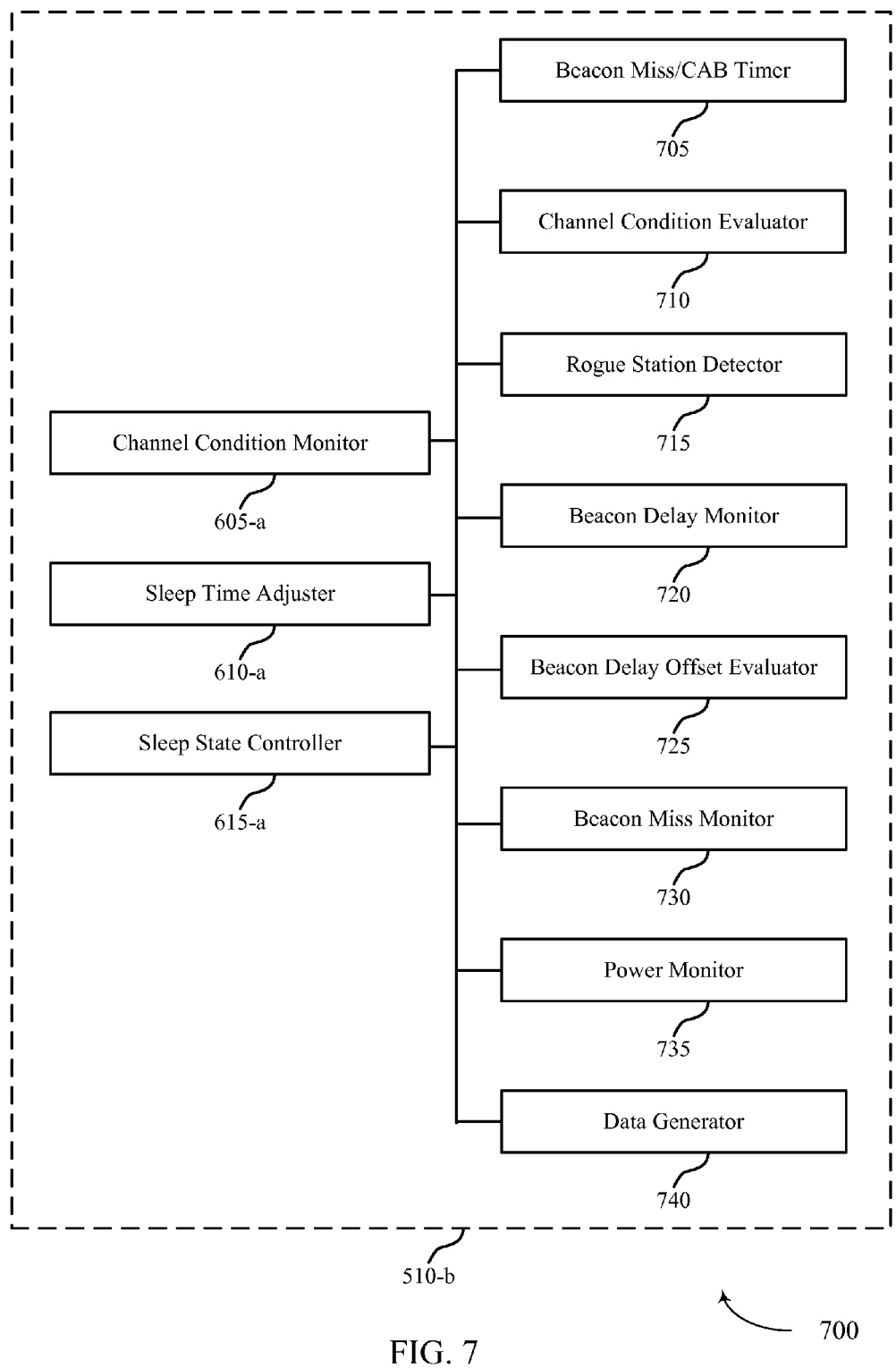
FIG. 7 shows a block diagram of a device for adapting blind reception duration for range and congestion in accordance with various aspects of the present disclosure.

FIG. 7 shows a block diagram 700 of a blind reception adapter 510-*b* for adapting blind reception duration for range and congestion in accordance with various aspects of the present disclosure. The blind reception adapter 510-*b* may be an example of aspects of a blind reception adapter 510 described with reference to FIGS. 5-6. The blind reception adapter 510-*b* may include a channel condition monitor 605-*a*, a sleep time adjuster 610-*a*, and a sleep state controller 615-*a*. Each of these modules may perform the functions described above with reference to FIG. 6. The blind reception adapter 510-*b* may also include a beacon miss/CAB timer 705, a channel condition evaluator 710, a rogue station detector 715, a beacon delay monitor 720, a beacon delay offset evaluator 725, a beacon miss monitor 730, a power monitor 735, and a data generator 740.

The components of the blind reception adapter 510-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The blind reception adapter 510-*b* may be configured such that the expected wireless transmission may be a DTIM beacon and the sleep timer may be a beacon miss timer as described above with reference to FIGS. 2-4. In some examples, the expected wireless transmission may be a CAB and the sleep timer may be a CAB timer.

The beacon miss/CAB timer 705 may initiate the beacon miss and/or CAB timer at the beacon reception period or in response to receiving the DTIM as described above with reference to FIGS. 2-4.

The channel condition evaluator 710 may compare the channel condition parameter to a congestion threshold as described above with reference to FIGS. 2-4.

The rogue station detector 715 may determine that a neighboring station is transmitting during a TBTT, wherein the channel condition parameter is based at least in part on the determination as described above with reference to FIGS. 2-4.

The beacon delay monitor 720 may measure a set of delays comprising a delay for each beacon in a set of monitored beacons as described above with reference to FIGS. 2-4.

The beacon delay offset evaluator 725 may determine a systematic beacon offset based at least in part on the set of delays, wherein adjusting the sleep timer is based on the systematic beacon offset as described above with reference to FIGS. 2-4. In some examples, determining the systematic offset comprises determining that a measure of variation for the set of delays may be less than a variation threshold.

The beacon miss monitor 730 may identify a number of missed beacons from a past number of beacons as described above with reference to FIGS. 2-4.

The power monitor 735 may measure a consumed power during a beacon wake cycle as described above with reference to FIGS. 2-4.

The data generator 740 may generate a datum relating the consumed power consumption and the range as described above with reference to FIGS. 2-4.

Figure 8:
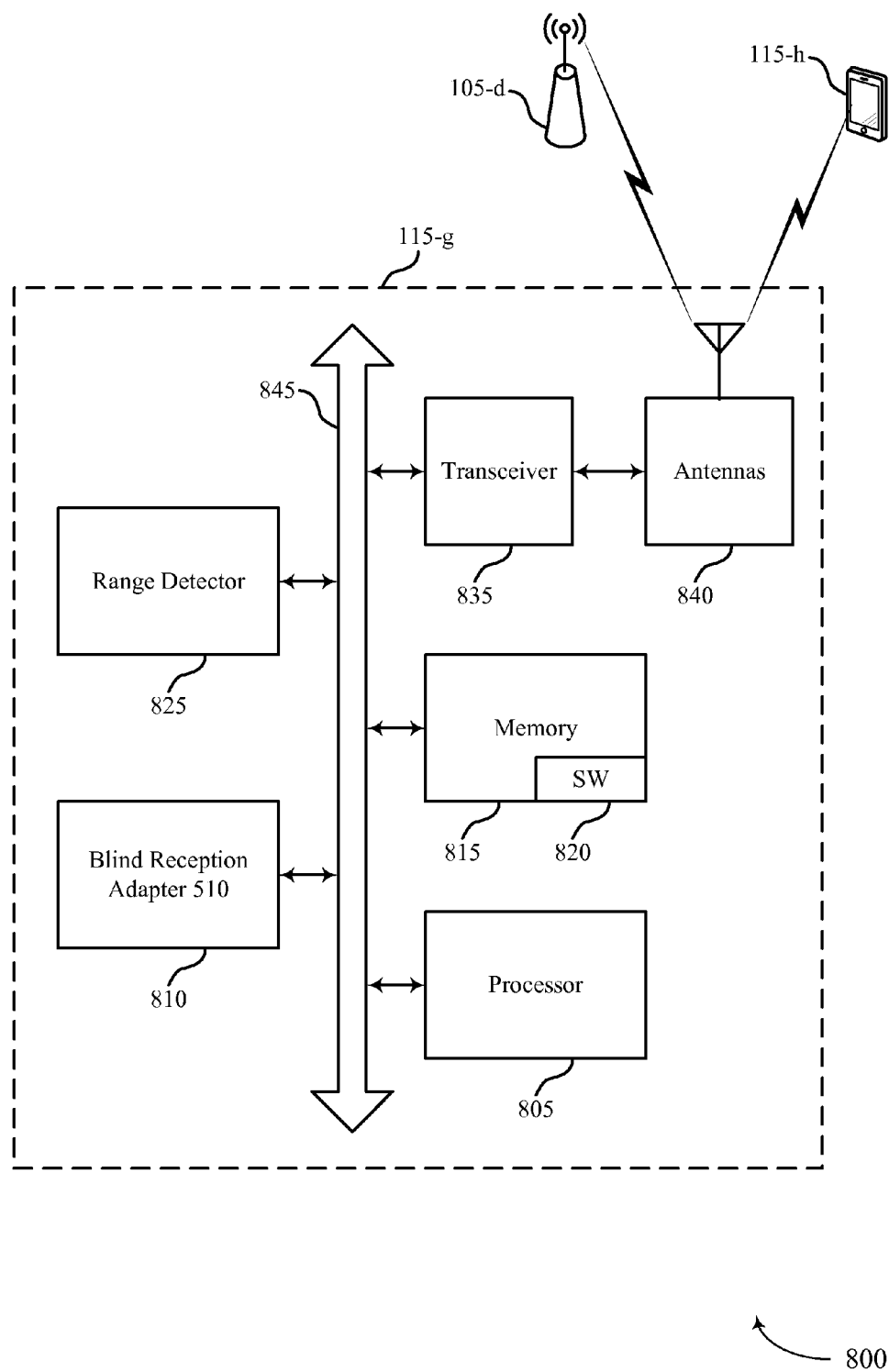
FIG. 8 illustrates a block diagram of a system for adapting blind reception duration for range and congestion in accordance with various aspects of the present disclosure.

FIG. 8 shows a diagram of a system 800 for adapting blind reception duration for range and congestion in accordance with various aspects of the present disclosure. System 800 may include a STA 115-g, which may be an example of an STA 115-g described above with reference to FIGS. 1-7. The STA 115-g may include a 810, which may be an example of a blind reception adapter 510 described with reference to FIGS. 2-7. The STA 115-g may also include a range detector. The STA 115-g may also include components for bi-directional voice and data communications including components for transmitting communications and components for receiving communications. For example, the STA 115-g may communicate bi-directionally with STA 115-h and/or a AP 105-d.

The range detector 825 may be configured such that the channel condition parameter may be based at least in part on a range between the station and an AP 105 as described above with reference to FIGS. 2-4.

The STA 115-g may also include a processor module 805, and memory 815 (including software (SW)) 820, a transceiver module 835, and one or more antenna(s) 840, which each may communicate, directly or indirectly, with each other (e.g., via buses 845. The transceiver module 835 may communicate bi-directionally, via the antenna(s) 840 and/or wired or wireless links, with one or more networks, as described above. For example, the transceiver module 835 may communicate bi-directionally with a AP 105 and/or another STA 115. The transceiver module 835 may include a modem to modulate the packets and provide the modulated packets to the antenna(s) 840 for transmission, and to demodulate packets received from the antenna(s) 840. While the STA 115-g may include a single antenna 840, the STA 115-g may also have multiple antennas 840 capable of concurrently transmitting and/or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., adapting blind reception duration for range and congestion, etc.). Alternatively, the software/firmware code 820 may not be directly executable by the processor module 805 but cause a computer (e.g., when compiled and executed) to perform functions described herein. The processor module 805 may include an intelligent hardware device, e.g., a central processing unit (CPU), a microcontroller, an ASIC, etc.

Figure 9:
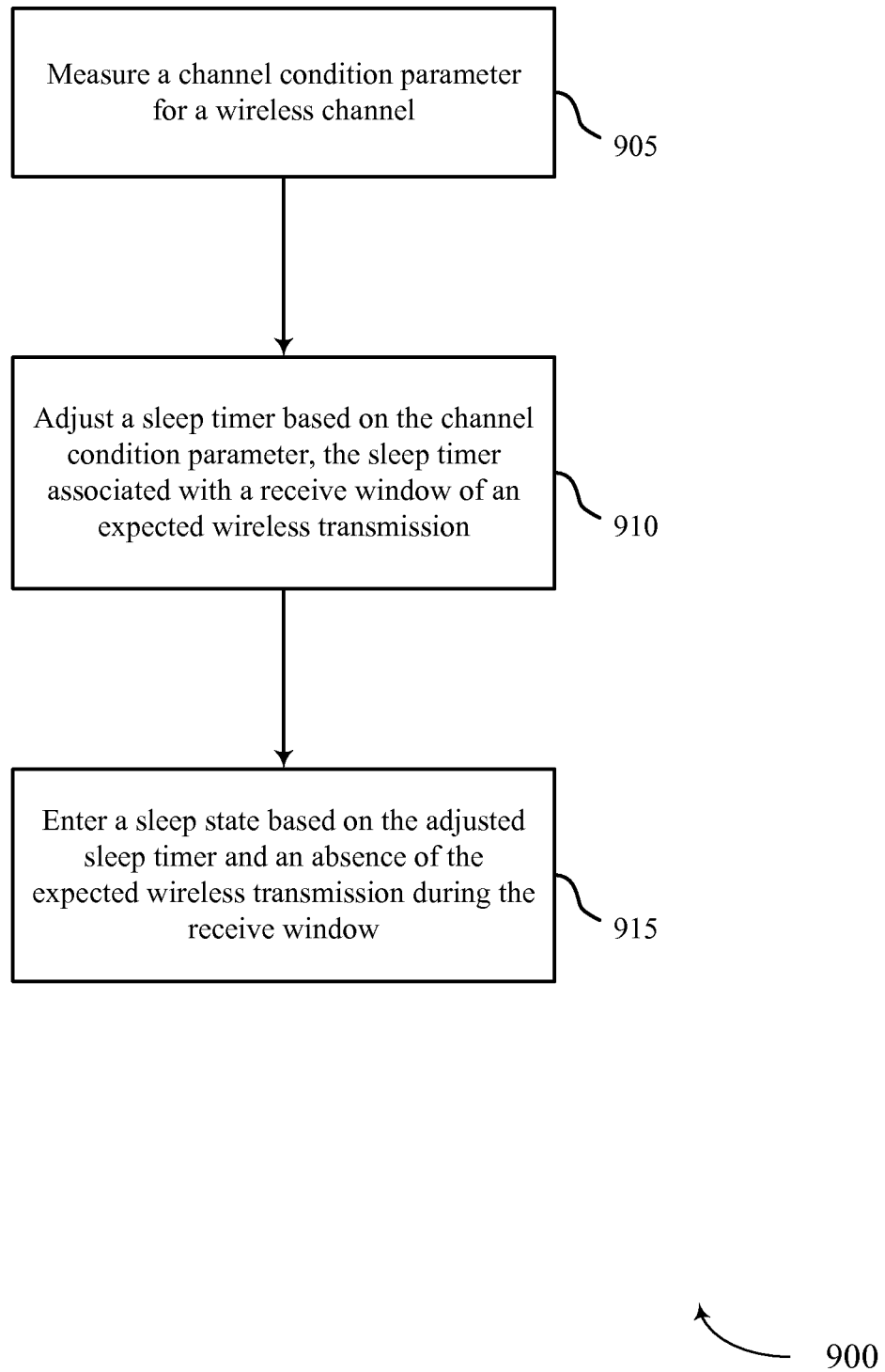
FIG. 9 shows a flowchart illustrating a method for adapting blind reception duration for range and congestion in accordance with various aspects of the present disclosure.

FIG. 9 shows a flowchart illustrating a method 900 for adapting blind reception duration for range and congestion in accordance with various aspects of the present disclosure. The operations of method 900 may be implemented by a STA 115 or its components as described with reference to FIGS. 1-8. In certain examples, the operations of method 900 may be performed by the blind reception adapter 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware.

At block 905, the STA 115 may measure a channel condition parameter for a wireless channel as described above with reference to FIGS. 2-4. In certain examples, the operations of block 905 may be performed by the channel condition monitor 605 as described above with reference to FIG. 6.

At block 910, the STA 115 may adjust a sleep timer based at least in part on the channel condition parameter, wherein the sleep timer is associated with a receive window of an expected wireless transmission as described above with reference to FIGS. 2-4. In certain examples, the operations of block 910 may be performed by the sleep time adjuster 610 as described above with reference to FIG. 6.

At block 915, the STA 115 may enter a sleep state based at least in part on the adjusted sleep timer and an absence of the expected wireless transmission during the receive window as described above with reference to FIGS. 2-4. In certain examples, the operations of block 915 may be performed by the sleep state controller 615 as described above with reference to FIG. 6.

Figure 10:
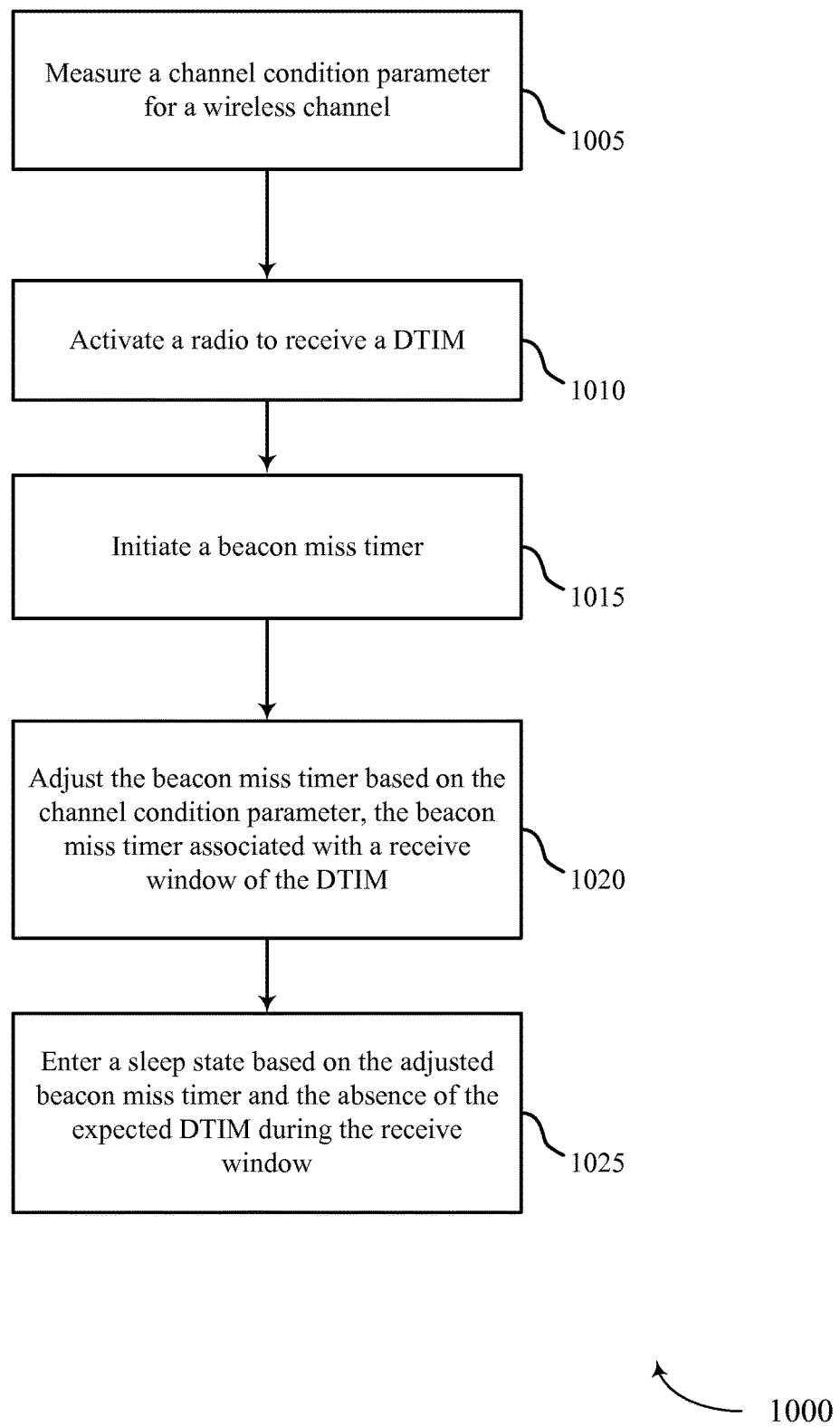
FIG. 10 shows a flowchart illustrating a method for adapting blind reception duration for range and congestion in accordance with various aspects of the present disclosure.

FIG. 10 shows a flowchart illustrating a method 1000 for adapting blind reception duration for range and congestion in accordance with various aspects of the present disclosure. The operations of method 1000 may be implemented by a STA 115 or its components as described with reference to FIGS. 1-8. In certain examples, the operations of method 1000 may be performed by the blind reception adapter 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1000 may also incorporate aspects of method 900 of FIG. 9.

At block 1005, the STA 115 may measure a channel condition parameter for a wireless channel as described above with reference to FIGS. 2-4. In certain examples, the operations of block 1005 may be performed by the channel condition monitor 605 as described above with reference to FIG. 6.

At block 1010, the STA 115 may activate a radio to receive a DTIM as described above with reference to FIGS. 2-4. In certain examples, the operations of block 1010 may be performed by the blind reception adapter 510-b as described above with reference to FIG. 7.

At block 1015, the STA 115 may the STA 115 may initiate a beacon miss timer as described above with reference to FIGS. 2-4. In certain examples, the operations of block 1015 may be performed by the beacon miss/CAB timer 705 as described above with reference to FIG. 7.

At block 1020, the STA 115 may adjust a beacon miss timer based at least in part on the channel condition parameter, wherein the beacon miss timer is associated with a receive window of a DTIM as described above with reference to FIGS. 2-4. In certain examples, the operations of block 1020 may be performed by the sleep time adjuster 610 as described above with reference to FIG. 6.

At block 1025, the STA 115 may enter a sleep state based at least in part on the adjusted beacon miss timer and an absence of the expected DTIM transmission during the receive window as described above with reference to FIGS. 2-4. In certain examples, the operations of block 1025 may be performed by the sleep state controller 615 as described above with reference to FIG. 6.

Figure 11:
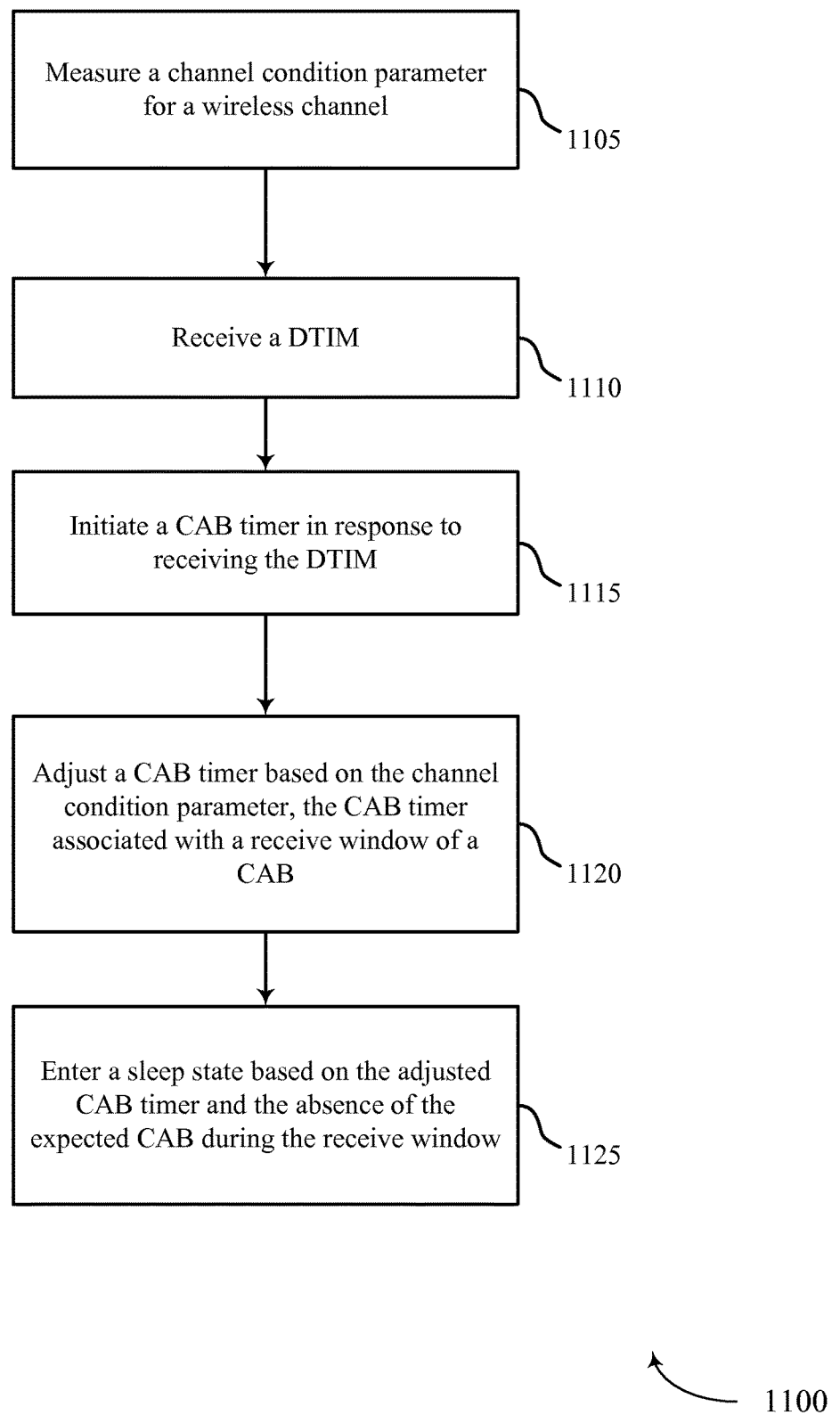
FIG. 11 shows a flowchart illustrating a method for adapting blind reception duration for range and congestion in accordance with various aspects of the present disclosure.

FIG. 11 shows a flowchart illustrating a method 1100 for adapting blind reception duration for range and congestion in accordance with various aspects of the present disclosure. The operations of method 1100 may be implemented by a STA 115 or its components as described with reference to FIGS. 1-8. In certain examples, the operations of method 1100 may be performed by the blind reception adapter 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1100 may also incorporate aspects of methods 900, and 1000 of FIGS. 9-10.

At block 1105, the STA 115 may measure a channel condition parameter for a wireless channel as described above with reference to FIGS. 2-4. In certain examples, the operations of block 1105 may be performed by the channel condition monitor 605 as described above with reference to FIG. 6.

At block 1110, the STA 115 may receive a DTIM as described above with reference to FIGS. 2-4. In certain examples, the operations of block 1110 may be performed by the receiver 505 as described above with reference to FIG. 5.

At block 1115, the STA 115 may initiate the CAB timer in response to receiving the DTIM as described above with reference to FIGS. 2-4. In certain examples, the operations of block 1115 may be performed by the beacon miss/CAB timer 705 as described above with reference to FIG. 7.

At block 1120, the STA 115 may adjust a CAB timer based at least in part on the channel condition parameter, wherein the CAB timer is associated with a receive window of an expected CAB transmission as described above with reference to FIGS. 2-4. In certain examples, the operations of block 1120 may be performed by the sleep time adjuster 610 as described above with reference to FIG. 6.

At block 1125, the STA 115 may enter a sleep state based at least in part on the adjusted CAB timer and an absence of the expected CAB transmission during the receive window as described above with reference to FIGS. 2-4. In certain examples, the operations of block 1125 may be performed by the sleep state controller 615 as described above with reference to FIG. 6.

Figure 12:
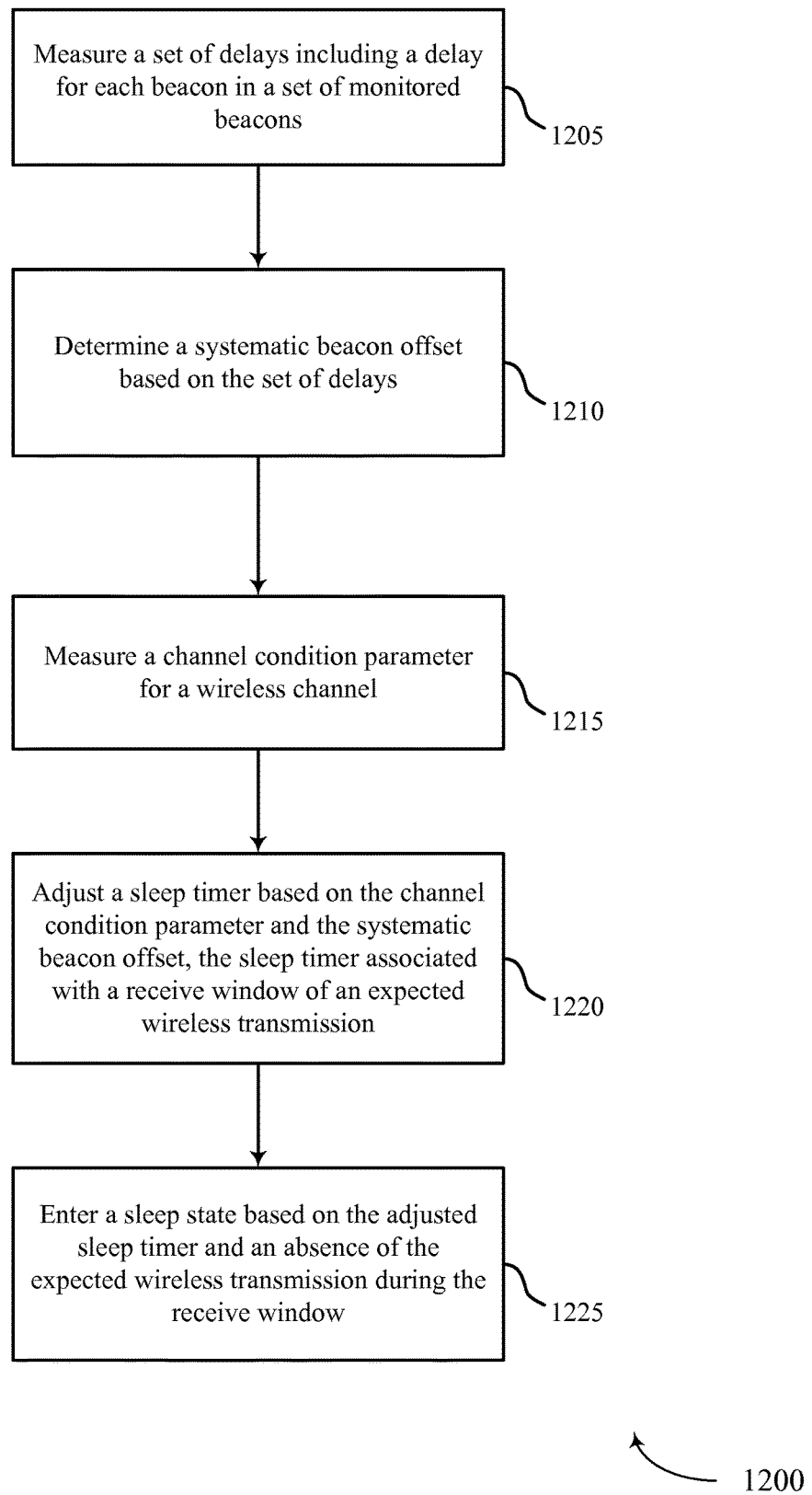
FIG. 12 shows a flowchart illustrating a method for adapting blind reception duration for range and congestion in accordance with various aspects of the present disclosure.

FIG. 12 shows a flowchart illustrating a method 1200 for adapting blind reception duration for range and congestion in accordance with various aspects of the present disclosure. The operations of method 1200 may be implemented by a STA 115 or its components as described with reference to FIGS. 1-8. In certain examples, the operations of method 1200 may be performed by the blind reception adapter 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1200 may also incorporate aspects of methods 900, 1000, and 1100 of FIGS. 9-11.

At block 1205, the STA 115 may measure a set of delays comprising a delay for each beacon in a set of monitored beacons as described above with reference to FIGS. 2-4. In certain examples, the operations of block 1205 may be performed by the beacon delay monitor 720 as described above with reference to FIG. 7.

At block 1210, the STA 115 may determine a systematic beacon offset based at least in part on the set of delays, wherein adjusting the sleep timer is based on the systematic beacon offset as described above with reference to FIGS. 2-4. In certain examples, the operations of block 1210 may be performed by the beacon delay offset evaluator 725 as described above with reference to FIG. 7.

At block 1215, the STA 115 may measure a channel condition parameter for a wireless channel as described above with reference to FIGS. 2-4. In certain examples, the operations of block 1215 may be performed by the channel condition monitor 605 as described above with reference to FIG. 6.

At block 1220, the STA 115 may adjust a sleep timer based at least in part on the channel condition parameter and the systematic beacon offset, wherein the sleep timer is associated with a receive window of an expected wireless transmission as described above with reference to FIGS. 2-4. In certain examples, the operations of block 1220 may be performed by the sleep time adjuster 610 as described above with reference to FIG. 6.

At block 1225, the STA 115 may enter a sleep state based at least in part on the adjusted sleep timer and an absence of the expected wireless transmission during the receive window as described above with reference to FIGS. 2-4. In certain examples, the operations of block 1225 may be performed by the sleep state controller 615 as described above with reference to FIG. 6.

Figure 13:
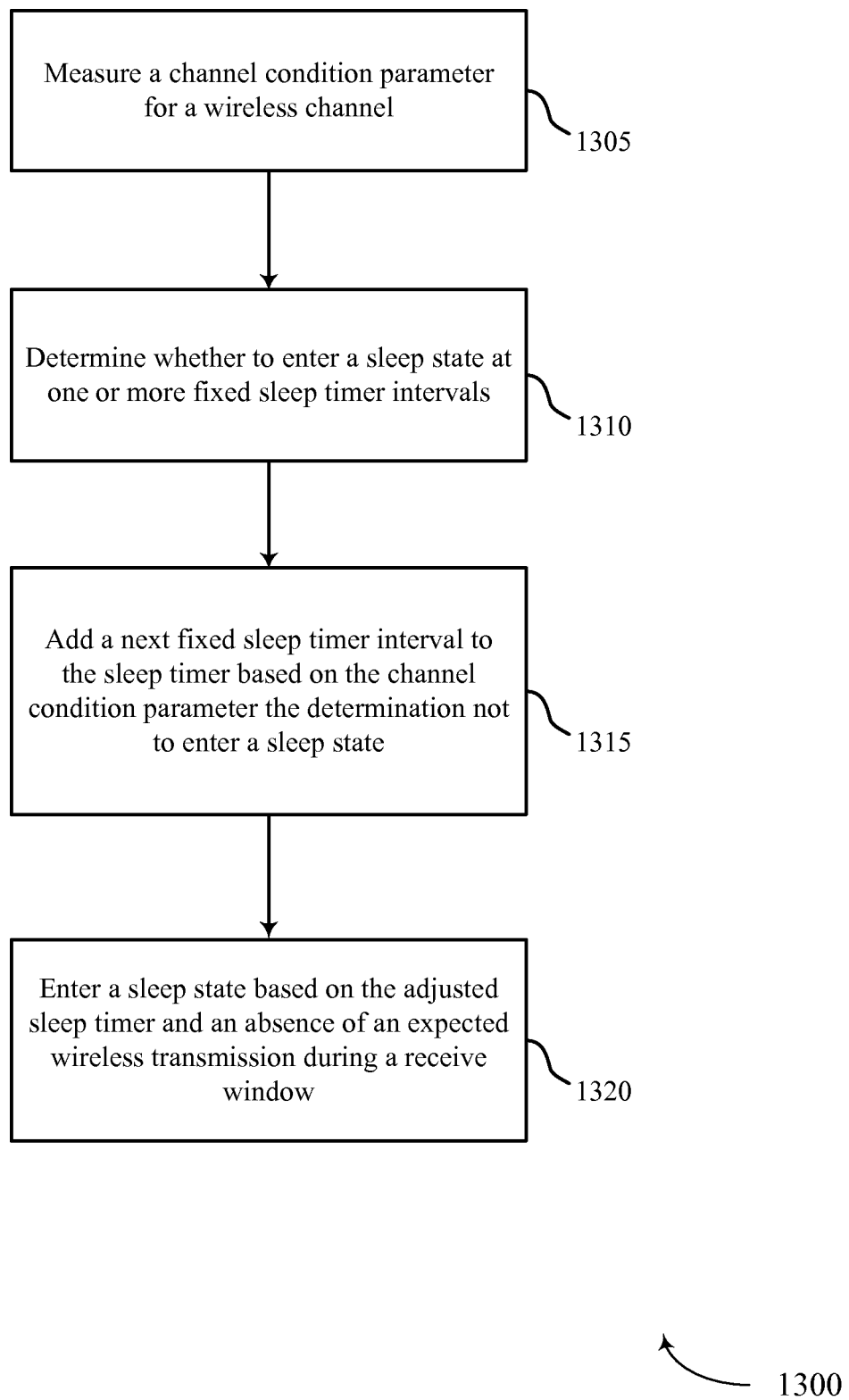
FIG. 13 shows a flowchart illustrating a method for adapting blind reception duration for range and congestion in accordance with various aspects of the present disclosure.

FIG. 13 shows a flowchart illustrating a method 1300 for adapting blind reception duration for range and congestion in accordance with various aspects of the present disclosure. The operations of method 1300 may be implemented by a STA 115 or its components as described with reference to FIGS. 1-8. In certain examples, the operations of method 1300 may be performed by the blind reception adapter 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1300 may also incorporate aspects of methods 900, 1000, 1100, and 1200 of FIGS. 9-12.

At block 1305, the STA 115 may measure a channel condition parameter for a wireless channel as described above with reference to FIGS. 2-4. In certain examples, the operations of block 1305 may be performed by the channel condition monitor 605 as described above with reference to FIG. 6.

At block 1310, the STA 115 may determine whether to enter a sleep state at one or more fixed sleep timer intervals of the sleep timer as described above with reference to FIGS. 2-4. In certain examples, the operations of block 1310 may be performed by the sleep state controller 615 as described above with reference to FIG. 6.

At block 1315, the STA 115 may add a next fixed sleep timer interval to the sleep timer based at least in part on a determination not to enter a sleep state at a previous fixed sleep timer interval of the one or more fixed sleep timer intervals as described above with reference to FIGS. 2-4. In certain examples, the operations of block 1315 may be performed by the sleep time adjuster 610 as described above with reference to FIG. 6.

At block 1320, the STA 115 may enter a sleep state based at least in part on the adjusted sleep timer and an absence of the expected wireless transmission during the receive window as described above with reference to FIGS. 2-4. In certain examples, the operations of block 1320 may be performed by the sleep state controller 615 as described above with reference to FIG. 6.

Figure 14:
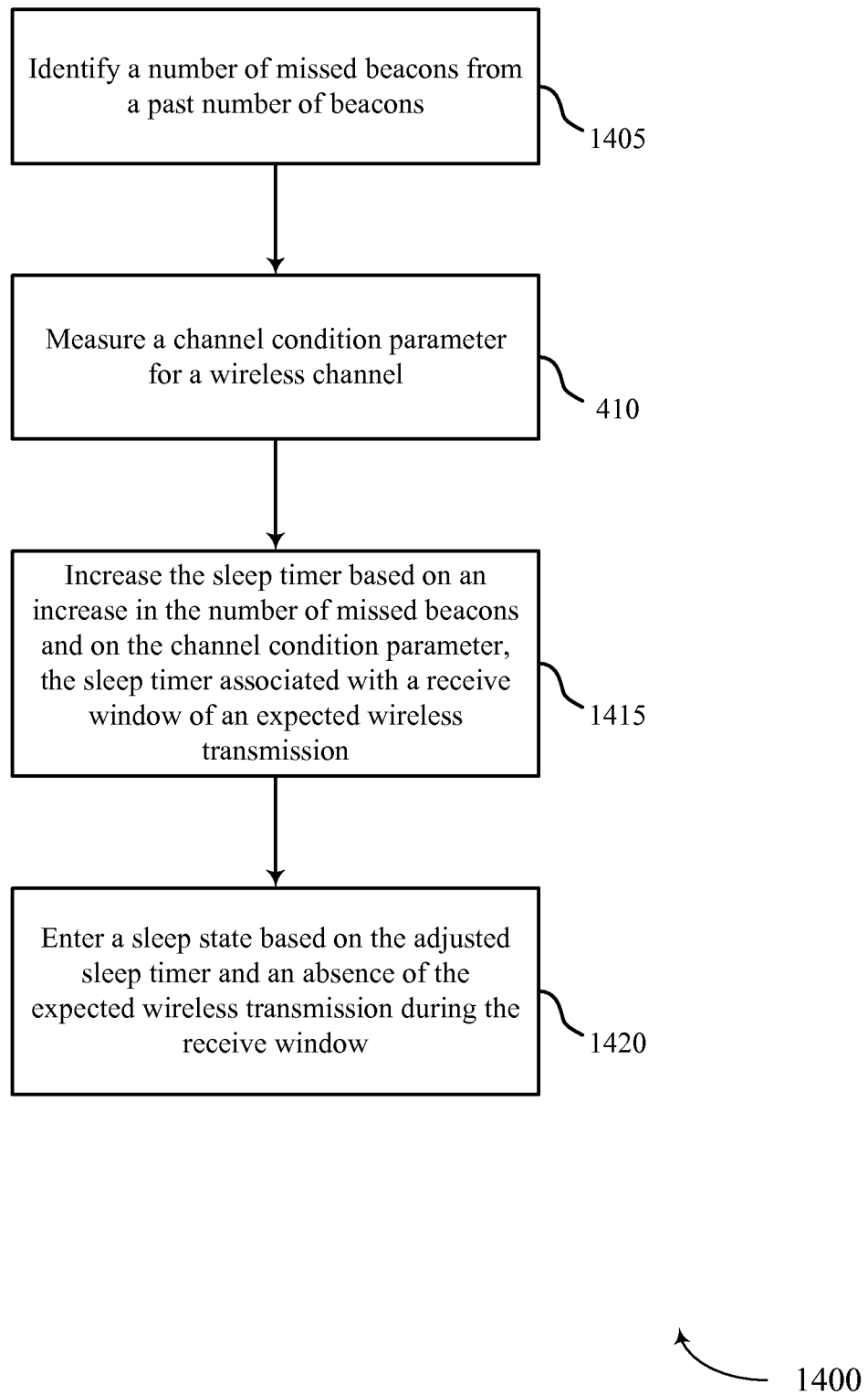
FIG. 14 shows a flowchart illustrating a method for adapting blind reception duration for range and congestion in accordance with various aspects of the present disclosure.

FIG. 14 shows a flowchart illustrating a method 1400 for adapting blind reception duration for range and congestion in accordance with various aspects of the present disclosure. The operations of method 1400 may be implemented by a STA 115 or its components as described with reference to FIGS. 1-8. In certain examples, the operations of method 1400 may be performed by the blind reception adapter 510 as described with reference to FIGS. 5-8. In some examples, a STA 115 may execute a set of codes to control the functional elements of the STA 115 to perform the functions described below. Additionally or alternatively, the STA 115 may perform aspects the functions described below using special-purpose hardware. The method 1400 may also incorporate aspects of methods 900, 1000, 1100, 1200, and 1300 of FIGS. 9-13.

At block 1405, the STA 115 may identify a number of missed beacons from a past number of beacons as described above with reference to FIGS. 2-4. In certain examples, the operations of block 1405 may be performed by the beacon miss monitor 730 as described above with reference to FIG. 7.

At block 1410, the STA 115 may measure a channel condition parameter for a wireless channel as described above with reference to FIGS. 2-4. In certain examples, the operations of block 1410 may be performed by the channel condition monitor 605 as described above with reference to FIG. 6.

At block 1415, the STA 115 may increase the sleep timer based at least in part on an increase in the number of missed beacons and the channel condition parameter as described above with reference to FIGS. 2-4. In certain examples, the operations of block 1415 may be performed by the sleep time adjuster 610 as described above with reference to FIG. 6.

At block 1420, the STA 115 may enter a sleep state based at least in part on the adjusted sleep timer and an absence of the expected wireless transmission during the receive window as described above with reference to FIGS. 2-4. In certain examples, the operations of block 1420 may be performed by the sleep state controller 615 as described above with reference to FIG. 6.

Thus, methods 900, 1000, 1100, 1200, 1300, and 1400 may provide for adapting blind reception duration for range and congestion. It should be noted that methods 900, 1000, 1100, 1200, 1300, and 1400 describe possible implementation, and that the operations and the steps may be rearranged or otherwise modified such that other implementations are possible. In some examples, aspects from two or more of the methods 900, 1000, 1100, 1200, 1300, and 1400 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   measuring a channel condition parameter for a wireless channel;
   adjusting a beacon miss sleep timer based at least in part on the channel condition parameter, wherein the beacon miss timer is associated with a first receive window of an expected delivery traffic indication message (DTIM) beacon transmission;
   adjusting a content after beacon (CAB) sleep timer based at least in part on the first receive window, wherein the CAB sleep timer is associated with a second receive window of an expected CAB transmission; and
   entering a single sleep state based at least in part on the adjusted beacon miss sleep timer, the adjusted CAB sleep timer, and an absence of one of the expected DTIM beacon transmission during the first receive window or the expected CAB transmission during the second receive window.

2. The method of claim 1, further comprising:
   receiving the expected DTIM beacon with a CAB forecast; and
   initiating the CAB timer in response to receiving the expected DTIM beacon.

3. The method of claim 1, further comprising:
   comparing the channel condition parameter to a congestion threshold.

4. The method of claim 3, wherein adjusting the beacon miss sleep timer or the CAB sleep timer comprises:
   reducing the beacon miss sleep timer or the CAB sleep timer based at least in part on a determination that the channel condition parameter satisfies the congestion threshold.

5. The method of claim 3, wherein adjusting the beacon miss sleep timer or the CAB sleep timer comprises:
   increasing the beacon miss sleep timer or the CAB sleep timer based at least in part on a determination that the channel condition parameter does not satisfy the congestion threshold.

6. The method of claim 1, further comprising:
   determining that a neighboring station is transmitting during a target beacon transmit time (TBTT), wherein the channel condition parameter is based at least in part on the determination.

7. The method of claim 1, further comprising:
   measuring a set of delays comprising a delay for each beacon in a set of monitored beacons; and
   determining a systematic beacon offset based at least in part on the set of delays, wherein adjusting the beacon miss sleep timer or the CAB sleep timer is based at least in part on the systematic beacon offset.

8. The method of claim 7, wherein determining the systematic beacon offset comprises:
   determining that a measure of variation for the set of delays is less than a variation threshold.

9. The method of claim 1, further comprising:
   determining whether to enter the sleep state at one or more fixed sleep timer intervals of the beacon miss sleep timer or the CAB sleep timer.

10. The method of claim 9, wherein adjusting the beacon miss sleep timer or the CAB sleep timer comprises:
    adding a next fixed sleep timer interval to the beacon miss sleep timer or the CAB sleep timer based at least in part on a determination not to enter the sleep state at a previous fixed sleep timer interval of the one or more fixed sleep timer intervals.

11. The method of claim 9, wherein the measured channel condition parameter is one of a set of measured channel condition parameters associated with the one or more fixed sleep timer intervals, and wherein adjusting the beacon miss sleep timer or the CAB sleep timer is based at least in part on the set of measured channel condition parameters.

12. The method of claim 1, further comprising:
    identifying a number of missed beacons from a past number of beacons; and
    wherein adjusting the beacon miss sleep timer or the CAB sleep timer comprises:
    increasing the beacon miss sleep timer or the CAB sleep timer based at least in part on identifying an increase in the number of missed beacons.

13. The method of claim 1, wherein the channel condition parameter is associated with hidden node detection.

14. The method of claim 1, wherein the channel condition parameter is based at least in part on a received signal strength indication (RSSI).

15. The method of claim 1, wherein the channel condition parameter is based at least in part on a range between a station and an access point (AP).

16. The method of claim 1, further comprising:
    measuring a consumed power during a beacon wake cycle; and
    generating a datum relating the consumed power and the range.

17. An apparatus for wireless communication, comprising:
    means for measuring a channel condition parameter for a wireless channel;
    means for adjusting a beacon miss sleep timer based at least in part on the channel condition parameter, wherein the beacon miss timer is associated with a first receive window of an expected delivery traffic indication message (DTIM) beacon transmission;
    means for adjusting a content after beacon (CAB) sleep timer based at least in part on the first receive window, wherein the CAB sleep timer is associated with a second receive window of an expected CAB transmission; and
    means for entering a single sleep state based at least in part on the adjusted beacon miss sleep timer, the adjusted CAB sleep timer, and an absence of one of the expected DTIM beacon transmission during the first receive window or the expected CAB transmission during the second receive window.

18. The apparatus of claim 17, further comprising:
    means for comparing the channel condition parameter to a congestion threshold; wherein the means for adjusting the beacon miss sleep timer or the CAB sleep timer comprises:

means for reducing the beacon miss sleep timer or the CAB sleep timer based at least in part on a determination that the channel condition parameter satisfies the congestion threshold; and
means for increasing the beacon miss sleep timer or the CAB sleep timer based at least in part on a determination that the channel condition parameter does not satisfy the congestion threshold.

19. The apparatus of claim 17, further comprising:
means for determining that a neighboring station is transmitting during a target beacon transmit time (TBTT), wherein the channel condition parameter is based at least in part on the determination.

20. The apparatus of claim 17, further comprising:
means for measuring a set of delays comprising a delay for each beacon in a set of monitored beacons; and
means for determining a systematic beacon offset based at least in part on the set of delays, wherein adjusting the beacon miss sleep timer or the CAB sleep timer is based at least in part on the systematic beacon offset.

21. The apparatus of claim 17, further comprising:
means for identifying a number of missed beacons from a past number of beacons; and
wherein adjusting the beacon miss sleep timer or the CAB sleep timer comprises:
increasing the beacon miss sleep timer or the CAB sleep timer based at least in part on identifying an increase in the number of missed beacons.

22. An apparatus for wireless communication, comprising:
a channel condition monitor to measure a channel condition parameter for a wireless channel;
a sleep time adjuster to adjust a beacon miss sleep timer based at least in part on the channel condition parameter, wherein the beacon miss sleep timer is associated with a first receive window of an expected delivery traffic indication message (DTIM) beacon transmission; and
the sleep time adjuster further to adjust a content after beacon (CAB) sleep timer based at least in part on the first receive window, wherein the CAB sleep timer is associated with a second receive window of an expected CAB transmission; and
a sleep state controller to enter a single sleep state based at least in part on the adjusted beacon miss sleep timer, the adjusted CAB sleep timer, and an absence of one of the expected DTIM beacon transmission during the first receive window or the expected CAB transmission during the second receive window.

23. The apparatus of claim 22, further comprising:
a channel condition evaluator to compare the channel condition parameter to a congestion threshold.

24. The apparatus of claim 23, wherein the sleep time adjuster is further to:
reduce the beacon miss sleep timer or the CAB sleep timer based at least in part on a determination that the channel condition parameter satisfies the congestion threshold; and
increase the beacon miss sleep timer or the CAB sleep timer based at least in part on a determination that the channel condition parameter does not satisfy the congestion threshold.

25. The apparatus of claim 22, further comprising:
a rogue station detector to determine that a neighboring station is transmitting during a target beacon transmit time (TBTT), wherein the channel condition parameter is based at least in part on the determination.

26. The apparatus of claim 22, further comprising a beacon delay monitor to:
measure a set of delays comprising a delay for each beacon in a set of monitored beacons; and
determine a systematic beacon offset based at least in part on the set of delays, wherein adjusting the beacon miss sleep timer or the CAB sleep timer is based at least in part on the systematic beacon offset.

27. The apparatus of claim 22, further comprising a beacon miss monitor to:
identify a number of missed beacons from a past number of beacons; and
wherein the sleep state controller is further to increase the beacon miss sleep timer or the CAB sleep timer based at least in part on identifying an increase in the number of missed beacons.

28. A non-transitory computer-readable medium storing code for adapting blind reception duration for range and congestion, the code comprising instructions executable by a processor to:
measure a channel condition parameter for a wireless channel;
adjust a beacon miss sleep timer based at least in part on the channel condition parameter, wherein the beacon miss timer is associated with a first receive window of an expected delivery traffic indication message (DTIM) beacon transmission;
adjust a content after beacon (CAB) sleep timer based at least in part on the first receive window, wherein the CAB sleep timer is associated with a second receive window of an expected CAB transmission; and
enter a single sleep state based at least in part on the adjusted beacon miss sleep timer, the adjusted CAB sleep timer, and an absence of one of the expected DTIM beacon transmission during the first receive window or the expected CAB transmission during the second receive window.

* * * * *